United States Patent
Kaplan et al.

(10) Patent No.: US 11,503,051 B2
(45) Date of Patent: Nov. 15, 2022

(54) MIGRATION OF TRAFFIC FLOWS

(71) Applicant: Perspecta Labs, Inc., Basking Ridge, NJ (US)

(72) Inventors: Michael Kaplan, Basking Ridge, NJ (US); David Shur, Basking Ridge, NJ (US); Vikram Kaul, Basking Ridge, NJ (US); Thomas Bowen, Basking Ridge, NJ (US)

(73) Assignee: Perspecta Labs Inc., Basking Ridge, NJ (US)

( * ) Notice: Subject to any disclaimer, the term of this patent is extended or adjusted under 35 U.S.C. 154(b) by 188 days.

(21) Appl. No.: 16/246,388

(22) Filed: Jan. 11, 2019

(65) Prior Publication Data

US 2019/0215332 A1     Jul. 11, 2019

Related U.S. Application Data

(60) Provisional application No. 62/616,284, filed on Jan. 11, 2018.

(51) Int. Cl.

| | |
|---|---|
| *H04L 9/40* | (2022.01) |
| *H04L 41/08* | (2022.01) |
| *H04L 43/08* | (2022.01) |
| *H04L 47/00* | (2022.01) |
| *H04L 43/062* | (2022.01) |
| *H04L 43/0876* | (2022.01) |
| *H04L 45/00* | (2022.01) |
| *H04L 41/0806* | (2022.01) |

(Continued)

(52) U.S. Cl.
CPC .......... *H04L 63/1425* (2013.01); *H04L 41/08* (2013.01); *H04L 41/0806* (2013.01); *H04L 43/062* (2013.01); *H04L 43/08* (2013.01); *H04L 43/0876* (2013.01); *H04L 45/00* (2013.01); *H04L 47/00* (2013.01); *H04L 63/10* (2013.01);

(Continued)

(58) Field of Classification Search
CPC . H04L 63/1425; H04L 41/08; H04L 41/0806; H04L 43/062; H04L 43/08; H04L 43/0876; H04L 45/00; H04L 47/00; H04L 63/10; H04L 63/1491
See application file for complete search history.

(56) References Cited

U.S. PATENT DOCUMENTS 9,130,982 B2 *  9/2015  Gottlieb .............. H04L 63/1416
9,317,304 B2    4/2016  Collado et al.
(Continued)

OTHER PUBLICATIONS

Urias et al. (Now You See Me, Now You Don't: Advancing Network Defense Through Network Deception, SAND2017-88920, 2017, 10 pages) (Year: 2017).*

(Continued)

*Primary Examiner* — Oleg Korsak
(74) *Attorney, Agent, or Firm* — Heslin Rothenberg Farley & Mesiti PC

(57) ABSTRACT

There is set forth herein obtaining data traffic monitoring data, the data traffic monitoring data being in dependence on monitoring of traffic received by a container of a protected computing environment; obtaining data traffic monitoring data, the data traffic monitoring data being in dependence on monitoring of traffic received by a processing resource of a computing environment; obtaining a state of the processing resource and provisioning a utility processing resource to include the state of the processing resource; and configuring the computing environment to route data traffic to the utility processing resource.

20 Claims, 10 Drawing Sheets

(51) Int. Cl.
*H04L 43/16* (2022.01)
*H04L 41/082* (2022.01)

(52) U.S. Cl.
CPC ........ *H04L 63/1491* (2013.01); *H04L 41/082* (2013.01); *H04L 43/16* (2013.01)

(56) References Cited

U.S. PATENT DOCUMENTS

| | | | |
|---|---|---|---|
| 9,386,030 B2 * | 7/2016 | Vashist | H04L 63/1425 |
| 9,524,214 B1 | 12/2016 | Isdal et al. | |
| 10,397,255 B1 * | 8/2019 | Bhalotra | H04L 63/1416 |
| 10,567,411 B2 * | 2/2020 | Bernstein | G06F 21/566 |
| 10,673,816 B1 * | 6/2020 | Robertson | H04L 63/1441 |
| 10,693,899 B2 * | 6/2020 | Levin | G06F 21/56 |
| 2010/0023810 A1 | 1/2010 | Stolfo et al. | |
| 2010/0107180 A1 | 4/2010 | Andreas et al. | |
| 2010/0122343 A1 | 5/2010 | Anup et al. | |
| 2012/0210333 A1 | 8/2012 | Shaya et al. | |
| 2013/0097659 A1 | 4/2013 | Das et al. | |
| 2014/0289807 A1 | 9/2014 | Collado et al. | |
| 2016/0099963 A1 | 4/2016 | Mahaffey et al. | |
| 2017/0180399 A1 | 6/2017 | Sukhomlinov et al. | |
| 2017/0353496 A1 | 12/2017 | Pai et al. | |
| 2018/0157524 A1 | 6/2018 | Saxena et al. | |
| 2019/0215332 A1 | 7/2019 | Kaplan et al. | |

OTHER PUBLICATIONS

"Docker Restore From Checkpoint—Cgroup and Mountpoints Error—Stack Overflow", Jul. 13, 2016, 2 pgs. Retrieved on Jun. 1, 2021 from Internet URL: https//stackoverflow.com/questions/38341320/docker-restore-from-checkport-cgroup-and-mountpoints-error.

Vikram. K., "[CRIU] Docker Restore From Checkpoint—Cgroup and Mountpoints Error", Jul. 12, 2016, 1 pg. Retrieved on Jun. 1, 2021 from Internet URL: https://lists.openyz.org/pipermail/crin/2016-July/030157.html.

Vikram. K., "[CRIU] Disable Dump of INet Connections During Checkpoint", Jun. 16, 2016, 2 pgs. Retrieved on Jun. 1, 2021 from Internet URL: https://lists.openyz.org/pipermail/criu/2016-June/029473.html.

"Welcome to CRIU, a project to implement checkpoint/restore functionality for Linux", 2 pgs. Retrieved on Sep. 13, 2021 from Internet URL: https://web.archive.org/web/20171209132948/https://criu.org/Main_Page On information and belief and according to current review, this document was published prior to Jan. 11, 2019.

"Killcx : close a TCP connection (for Linux)", 2 pgs. Retrieved on Sep. 13, 2021 from Internet URL: https://web.archive.org/web/20171211053223/http://killcx.sourceforge.net/ On information and belief and according to current review, this document was published prior to Jan. 11, 2019.

"Checkpointing and live migration", 3 pgs. Retrieved on Sep. 13, 2021 from Internet URL: https://web.archive.org/web/20170708143102/https://openyz.org/Checkpointing_and_live_migration/ On information and belief and according to current review, this document was published prior to Jan. 11, 2019.

Stavrou, A., et al., "On the Move: Evading Distributed Denial-of-Service Attacks", in *IEEE Computer*, vol. 49, No. 3, Mar. 2016, pp. 104-107.

* cited by examiner

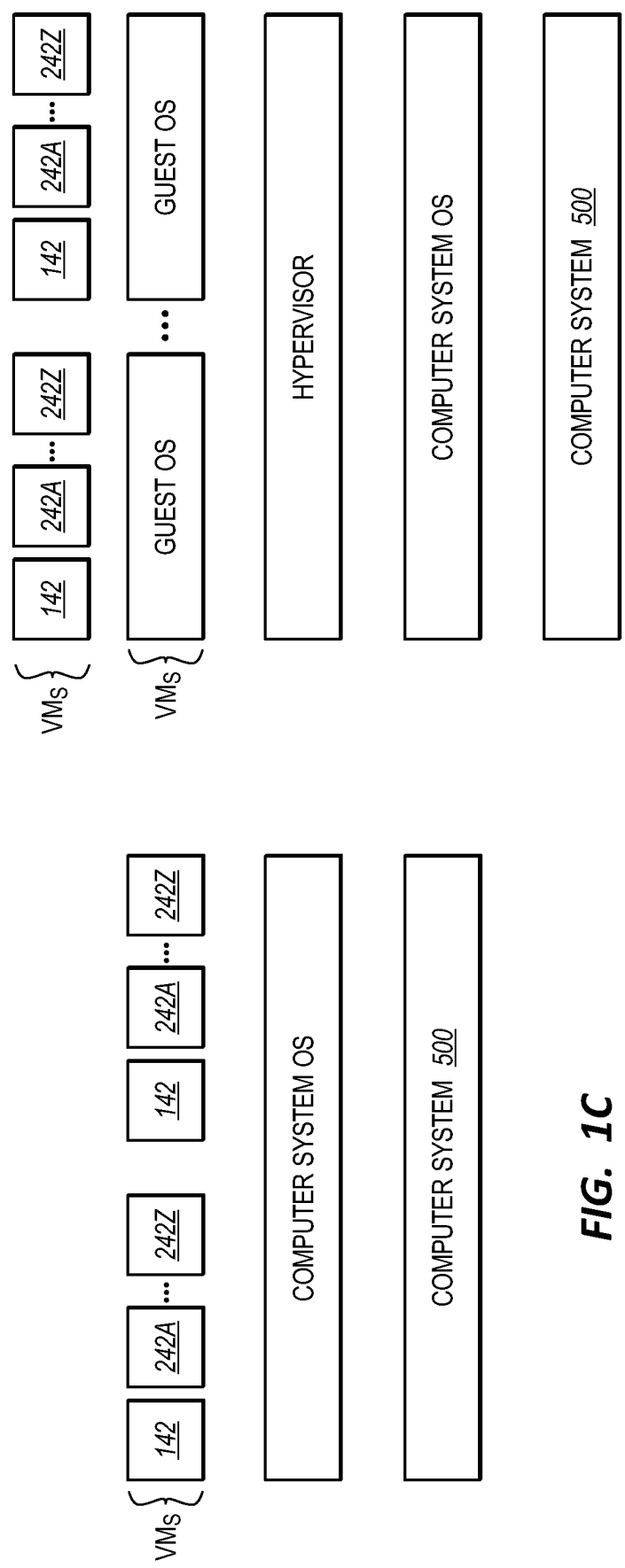

MIGRATION OF TRAFFIC FLOWS

CROSS REFERENCE TO RELATED APPLICATIONS

This application claims priority to U.S. Patent Application No. 62/616,284, filed Jan. 11, 2018, entitled, "Migration of Traffic Flows," which is incorporated herein by reference in its entirety.

GOVERNMENT RIGHTS STATEMENT

This invention was made with U.S. Government support under Agreement No. HR0011-16-C-0061 awarded by DARPA on Apr. 12, 2016. The U.S. Government has certain rights in this invention.

BACKGROUND

A client-server architecture can include a single or small set of end-hosts providing an application service to many simultaneous remote clients (e.g. web server, VoIP server, chat server, etc.).

This type of architecture is often the target of cyber-attacks because degrading or denying access to a few select targets (servers in this case) can have significant impact on user performance (clients who can no longer connect to the server or receive reasonable throughput or application performance at the server). Many of these attacks, in particular low-volume Distributed Denial of Service (DDoS), can cause degradation and denial effects by causing connections or traffic flows using messages that exploit design factors in the server application or protocol which can cause a server to become resource overloaded.

BRIEF DESCRIPTION

There is set forth herein, according to one aspect, a method. The method can include, for example: obtaining data traffic monitoring data, the data traffic monitoring data being in dependence on monitoring of traffic received by a processing resource of a protected computing environment; obtaining a state of the processing resource and provisioning a utility processing resource to include the state of the processing resource; and configuring the protected computing environment to route data traffic to the utility processing resource.

There is set forth herein a computer program product. A computer program product can include a computer readable storage medium readable by one or more processing circuit and storing instructions for execution by one or more processor for performing a method. The method can include, for example: obtaining data traffic monitoring data, the data traffic monitoring data being in dependence on monitoring of traffic received by a processing resource of a protected computing environment; obtaining a state of the processing resource and provisioning a utility processing resource to include the state of the processing resource; and configuring the protected computing environment to route data traffic to the utility processing resource.

There is set forth herein a system. A system can include, for example a memory. In addition, the system can include one or more processor in communication with the memory. Further, the system can include program instructions executable by the one or more processor via the memory to perform a method. The method can include, for example: obtaining data traffic monitoring data, the data traffic monitoring data being in dependence on monitoring of traffic received by a processing resource of a protected computing environment; obtaining a state of the processing resource and provisioning a utility processing resource to include the state of the processing resource; and configuring the protected computing environment to route data traffic to the utility processing resource.

There is set forth herein, according to one aspect, a method. The method can include, for example: obtaining data traffic monitoring data, the data traffic monitoring data being in dependence on monitoring of traffic received by a container of a protected computing environment; instantiating a utility container; obtaining a state of the container and provisioning the utility container to include the state of the container; and configuring the protected computing environment to route data traffic to the utility container.

There is set forth herein a computer program product. A computer program product can include a computer readable storage medium readable by one or more processing circuit and storing instructions for execution by one or more processor for performing a method. The method can include, for example: obtaining data traffic monitoring data, the data traffic monitoring data being in dependence on monitoring of traffic received by a container of a protected computing environment; instantiating a utility container; obtaining a state of the container and provisioning the utility container to include the state of the container; and configuring the protected computing environment to route data traffic to the utility container.

There is set forth herein a system. A system can include, for example a memory. In addition, the system can include one or more processor in communication with the memory. Further, the system can include program instructions executable by the one or more processor via the memory to perform a method. The method can include, for example: obtaining data traffic monitoring data, the data traffic monitoring data being in dependence on monitoring of traffic received by a container of a protected computing environment; instantiating a utility container; obtaining a state of the container and provisioning the utility container to include the state of the container; and configuring the protected computing environment to route data traffic to the utility container.

DRAWINGS

These and other features, aspects, and advantages set forth herein will become better understood when the following detailed description is read with reference to the accompanying drawings in which like characters represent like parts throughout the drawings, wherein:

FIGS. 1C and 1D illustrate various architectures for use in a host system of a computing environment;

DETAILED DESCRIPTION

Figure 1A:
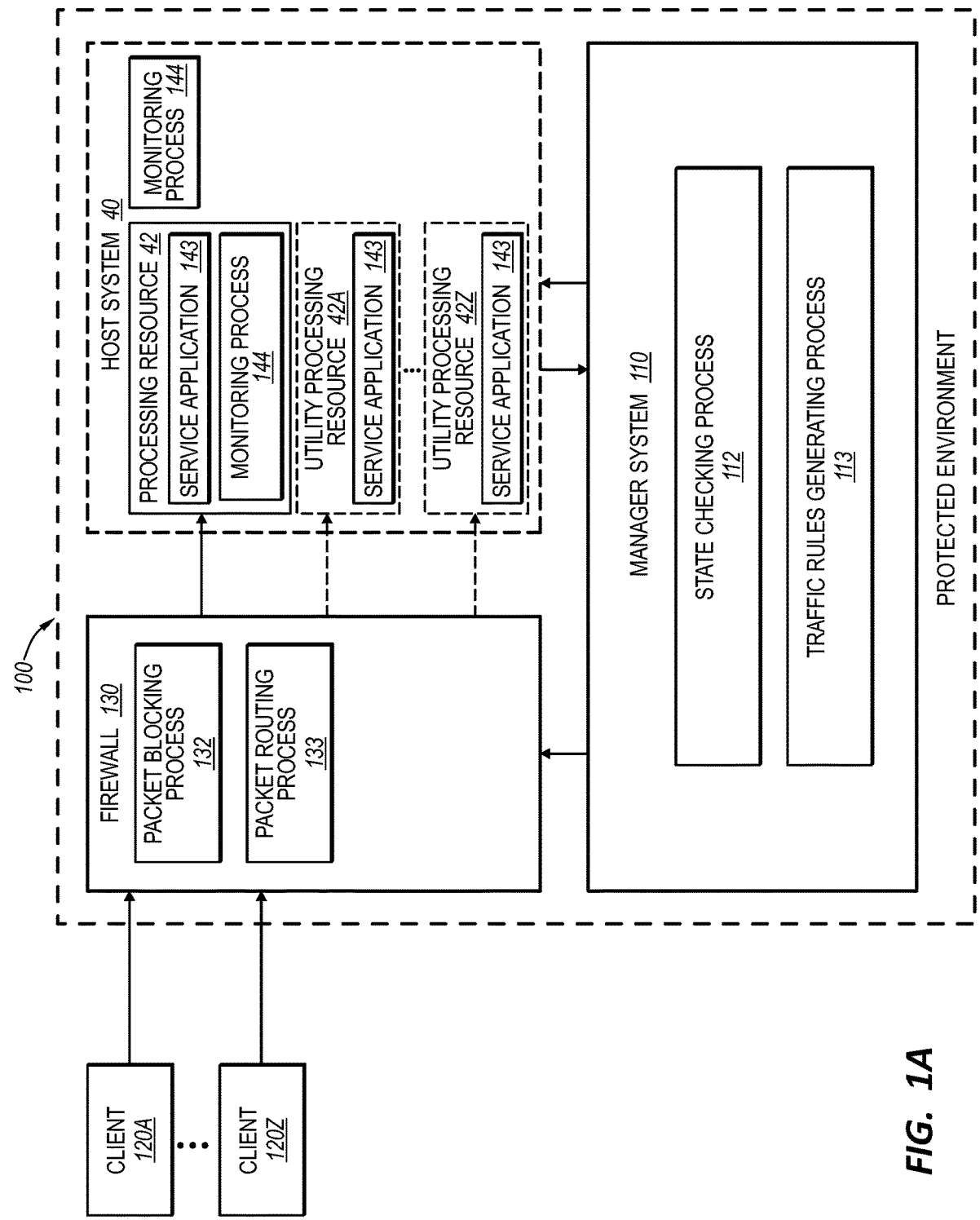
FIG. 1A is a schematic block diagram illustrating a system for migrating traffic flow according to one embodiment.

A system 100 for use in performing migration of traffic flows is illustrated in FIG. 1A. System 100 can include manager system 110, firewall 130, and host system 40. Manager system 110, firewall 130, and host system 40 can be disposed within a protected environment. System 100 which can define a computing environment can receive traffic from one or more client of clients 120A-120Z. Manager system 110 can run a state checking process 112 and a traffic rules generating process 113. Firewall 130 can run packet blocking process 132 and packet routing process 133. Host system 40 can include processing resource 42 for use in providing a service to requesting clients of clients 120A-120Z. Processing resource 42 can run service application 143 for access by one or more client of clients 120A-120Z.

System 100 can be configured to use one or more utility processing resource 42A-42Z that can run the service application 143 that can be run with processing resource 42 for access by clients of clients 120A-120Z. Host system 40 can run a monitoring process 144 for use in determining that one or more criterion has been satisfied. Monitoring process 144 can be run e.g. internal to processing resource 42 and/or external to processing resource 42.

In one embodiment, one or more of firewall 130, host system 40, and manager system 110 can be co-located with one another. In one embodiment, firewall 130, host system 40 and manager system 110 can be external to one another.

Firewall 130 can monitor and control incoming and outgoing network traffic based on security rules. In one embodiment firewall 130 can be provided by a host system based firewall.

Figure 1B:
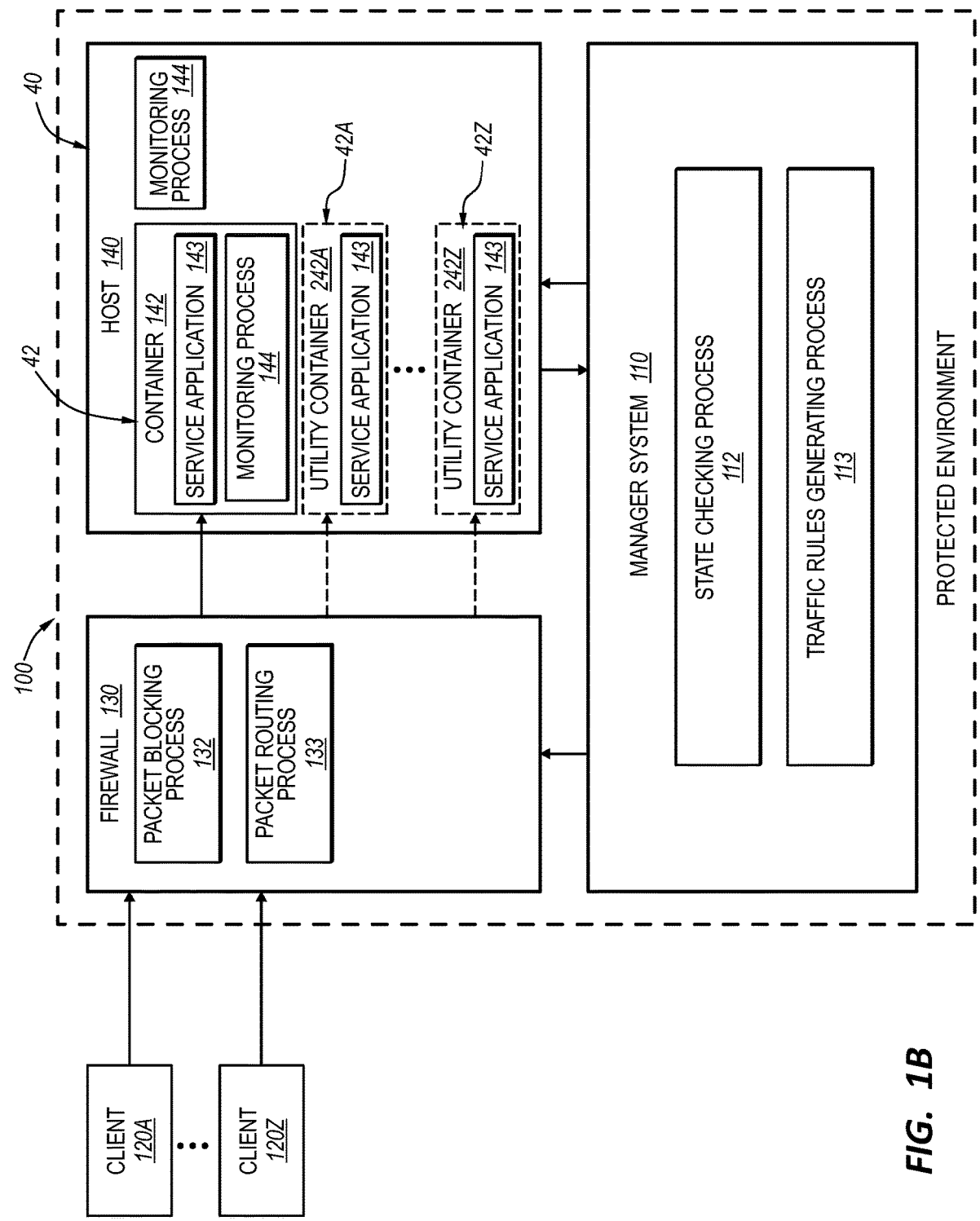
FIG. 1B is a schematic block diagram illustrating a system for migrating traffic flow according to one embodiment.

FIG. 1B illustrates an exemplary specific embodiment of system 100 as set forth in FIG. 1A. In system 100 of FIG. 1B, host system 40 is shown as being provided by host 140, processing resource 42 is shown as being provided by container 142 and utility processing resources 42A-42Z are shown as being provided by utility containers 242A-242Z. Methods for use with system 100 of FIG. 1B are set forth in reference to FIGS. 1-4.

Host system 40 can include architectures as described with reference to one or more of FIG. 1C or 1D. In FIG. 1C container 142 and containers 242A-242Z are shown running on a host defined by computer system 500 (physical computer system) having an associated operating system. In FIG. 1D container 142 and containers 242A-242Z are shown running on a host defined by a virtual machine (VM) provided by a hypervisor based virtual machine running on a hypervisor that runs on computer system 500 having an associated operating system. In FIG. 1B processing resource 42 and utility processing resources 142A-142Z can be provided respectively by container 142 and containers 242A-242Z wherein containers container 142 and containers 242A-242Z are virtual machines (VMs) defined by container based virtual machines. In another embodiment, one or more of processing resources 42 or resources of utility processing resources 142A-142Z can be provided by virtual machines (VMs) defined by hypervisor based virtual machines. In another embodiment, one or more of processing resources 42 or resources of utility processing resources 142A-142Z can be provided by computer systems 500 (physical computer systems).

A system 100 for use in performing migration of traffic flows is illustrated in FIG. 1B. System 100 can include manager system 110, firewall 130, and host 140. Manager system 110, firewall 130, and host 140 can be disposed within a protected environment. System 100 which can define a protected environment can receive traffic from one or more client of clients 120A-120Z. Manager system 110 can run a state checking process 112 and a traffic rules generating process 113. Firewall 130 can run packet blocking process 132 and packet routing process 133. Host 140 can include a container 142 for use in providing a service to requesting clients of clients 120A-120Z. Container 142 can run service application 143 for access by one or more client of clients 120A-120Z.

System 100 can be configured to instantiate one or more utility container 242A-242Z that can run the service application 143 that can be run with container 142 for access by clients of clients 120A-120Z. Host 140 can run a monitoring process 144 for use in determining that one or more criterion has been satisfied. Monitoring process 144 can be run e.g. internal to container 142 and/or external to container 142.

In one embodiment, one or more of firewall 130, host 140, and manager system 110 can be co-located with one another. In one embodiment, firewall 130, host 140 and manager system 110 can be external to one another. In one embodiment, container 142 and utility containers 242A-242Z which can be regarded as container based virtual machines (VMs) can be substituted for by alternative virtual hardware, e.g. hypervisor based virtual machines (VMs) running on a hypervisor.

Firewall 130 can monitor and control incoming and outgoing network traffic based on security rules. In one embodiment firewall 130 can be provided by a host based firewall.

Container 142 and utility containers 242A-242Z can provide operating system level virtualization that allows limitation and prioritization of resources (e.g. CPU, memory, I/O, network) as well as namespace isolation. According to the namespace isolation feature, container and utility containers 242A-242Z can provide isolation of an application's view of the operating environment including process trees, user IDs, networking, and file systems. Container 142 and utility containers 242A-242Z can share a common operating system (OS) and kernel, namely the OS and kernel of host 140. Relative to hypervisor based VMs containers defining container based VMs consume less resources and can be deployed more rapidly. In one embodiment, containers 142 and 242A-242Z can be provided by LINUX® containers. (Linux® is a registered trademark of Linus Torvalds). Other container based VMs that can be utilized include e.g. SOLARIS® containers (SOLARIS® is a registered trademark of Oracle Corporation), ICORE® VIRTUAL ACCOUNTS®, (ICORE® VIRTUAL ACCOUNTS® are registered trademarks of iCore Software, Inc.), VIRTUOZZO® containers (VIRTUOZZO® is a registered trademark of Virtuozzo International Gmbh).

Service application 143 running within a container 142 subject to virtualization by the instantiation of utility containers 242A-242Z can be provided e.g. by a web service application, a Session Initiated Protocol (SIP) service application, or a chat service application, or any type of service application. Host 140 can include multiple instances of container 142 and utility containers 242A-242Z, and each such instance can run a different common service application 143 (e.g. a first instance for web service, a second instance for SIP, a third instance for chat).

A method 200 that can be performed by manager system 110 is described with reference to the flowchart of FIG. 2. System 100, e.g. manager system 110 at block 210 can perform obtaining data traffic monitoring data, the data traffic monitoring data being in dependence on monitoring of traffic received by a container of a protected computing environment. System 100, e.g. manager system 110 at block 220 can perform instantiating a utility container. System 100, e.g. manager system 110 at block 230 can perform obtaining a state of the container and provisioning the utility container to include the state of the container. System 100, e.g. manager system 110 at block 240 can perform configuring the protected computer environment to route data traffic to the utility container.

Figure 3:
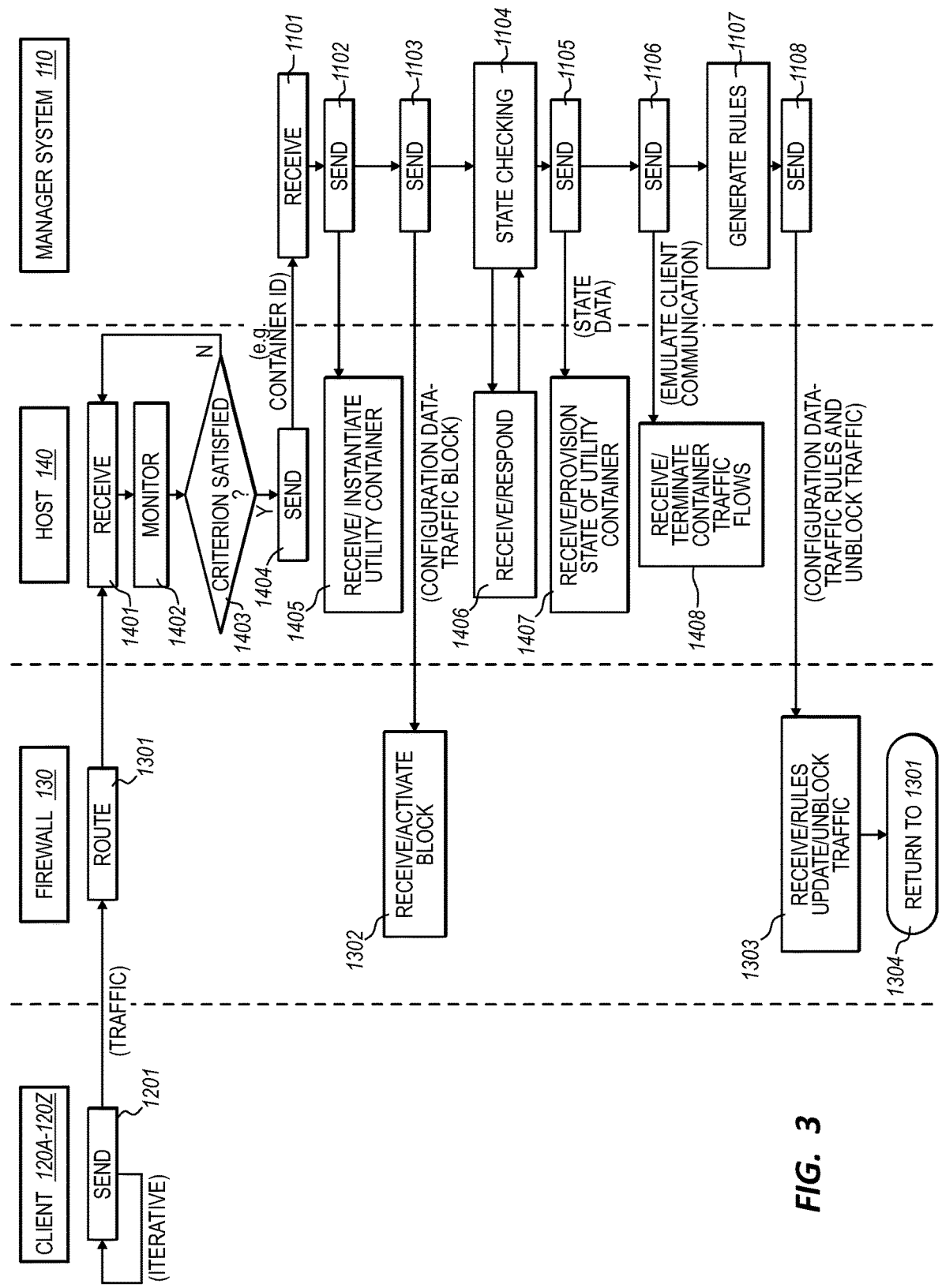
FIG. 3 is a flowchart depicting a method for performance by a manager system interoperating with other components according to one embodiment.

An example of manager system 110 performing method 200 is described with reference to the flowchart of FIG. 3, illustrating functions of manager system 110 interoperating with clients 120A-120Z, firewall 130, and host 140.

At block 1201, one or more client of clients 120A-120Z can be iteratively sending data traffic to protected environment. At block 1301 firewall 130 can be intercepting the received data traffic and can route the received data traffic to container 142 of host 140. At block 1401 host 140, e.g. by container 142 can receive the sent data traffic sent at block 1201 and routed at block 1301. At block 1402, host 140 can be monitoring received data traffic to detect for data traffic satisfying one or more criterion. Monitoring process 144, e.g. internal to container 142 or external to container 142 can be running to perform the monitoring at block 1402. At block 1403 host 140 can determine that data traffic satisfying one or more criterion has been detected. Host 140 can continue with the loop depicted at blocks 1401, 1402, and 1403 until traffic satisfying one or more criterion is detected and can branch to block 1404 responsively to the one or more criterion being satisfied. In one embodiment, the one or more criterion can be the criterion that suspicious data traffic is being received.

At block 1404 host 140 can send a communication for receipt by manager system 110 at block 1101. The communication sent at block 1404 can indicate that the one or more criterion monitored for at block 1403 has occurred. The communication sent at block 1404 can include an identifier of the container 142 subject to traffic monitoring for determining whether the one of more criterion has been satisfied. Manager system 110 performing obtaining data traffic monitoring data at block 210 (FIG. 2) can include manager system 110 receiving the communication at block 1101. On the receipt of the communication at block 1101, manager system 110 at block 1102 can send a communication to host 140 for receipt by host 140 at block 1405. A communication sent at block 1102 can include command data commanding host 140 to instantiate a utility container.

On receipt of the communication sent at block 1102, host 140 at block 1405 can instantiate a utility container e.g. utility container 242A that can function to provide the service provided by container 142. The utility container 242A instantiated at block 1405 can have at the time of the instantiation at block 1405 an initial state that is not in common with a current state of container 142.

At block 1103 manager system 110 can send a communication for receipt by firewall 130 at block 1302. A communication sent at block 1103 can include configuration data for configuring firewall 130 to block incoming data traffic from clients 120A-120Z. On receipt of the communication sent at block 1103, firewall 130 at block 1302 can activate packet blocking process 132 to block received data traffic received from clients 120A-120Z for receipt by container 124. The blocking of target flows at block 1302 can assure that when the newly instantiated utility container instantiated at block 1405 has started e.g. at subsequent block 1407, it can have a state in common with container 142 (otherwise, without blocking target flows container and utility container states can become desynchronized).

At block 1104, manager system 110 can perform state checking to check the state of container 142. At block 1104, manager system 110 can send a check state request to host 140 for receipt by host 140 at block 1406. At block 1406, host 140 can respond to the state check request with state data specifying the state of container 142. In response to receipt of the state data, manager system 110 can proceed to block 1105. State data defining a state of a container can include e.g. data that specifies process state, file state, open socket state, connection state, and/or resource state. System 100 can use the state data to transfer the state of container 142 to utility container 242A at a later time.

At block 1105 manager system 110 can send state data to host 140 for receipt by host 140 at block 1407. The state data sent by manager system 110 at block 1105 can be provided by the container state data returned to manager system 110 by host 140 at block 1406 that specifies the state of container 142 at the time of state checking block 1104 subsequent to traffic blocking at block 1302. In response to the receipt of the state data at block 1407, host 140 at block 1407 can provision utility container 242A instantiated at block 1405 to include the state of container 142.

With the state of utility container 242A transformed at block 1407 to be in common with a state of container 142, utility container 242A can be started at block 1407 in response to the communication received at block 1407.

In response to completion at block 1105, manager system 110 can proceed to block 1106. State data defining a state of a container can include e.g. data that specifies process state, file state, open socket state, connection state, and/or resource state. System 100 can use the state data to transfer the state of container 142 to utility container 242A.

At block 1106 manager system 110 can send one or more emulated communication to host 140 for receipt by container 142 of host 140 and/or utility container 242A of host 140 at block 1408. By the method set forth in the flowchart of FIG. 4 in the described scenario, manager system 110 can perform functions to migrate traffic being directed to container 142 from a certain set of one or more client of clients 120A-120Z so that the traffic from the certain set of one or more client of clients 120A-120Z is instead directed to utility container 242A.

The one or more emulated communication to host 140 sent at block 1106 can include one or more emulated communication to terminate at least one traffic flow not being maintained as a result of manager system 110 performing functions to migrate traffic being directed to container 142 from a certain one or more client of clients 120A-120Z so that the traffic from the certain one or more client of clients 120A-120Z is instead directed to utility container 242A. In the described scenario, the one or more emulated communication to host 140 sent at block 1106 can include one or more emulated communication to container 142 that emulates a communication from the certain one or more client to terminate traffic flow between the container 142 and the certain one or more client which as a result of migration will send traffic to utility container 242A rather than container 142. In the described scenario, the one or more emulated communication to host 140 sent at block 1106 can include at least one emulated communication to utility container 242A that emulates a request from client(s) (i.e. client(s) other than the certain one or more client) that are continuing to communicate with container 142 to terminate traffic flow between the utility container 242A (which at block 1408 is provisioned to have a state in common with a state of container 142) and the client(s).

In one embodiment, where monitoring at block 1402 includes monitoring for suspicious traffic, the one or more emulated communication sent at block 1106 can include a communication to container 142 that emulates a communication sent by an identified suspicious client of clients 120A-120Z (identified as a suspicious client sending suspicious traffic by traffic monitoring performed at block 1402). In response to receipt of the emulated communication to container 142 sent at block 1106, container 142 of host 140 at block 1408 can terminate container traffic flows with identified suspicious client. In the embodiment where monitoring at block 1402 includes monitoring for suspicious traffic, the one or more emulated communication sent at block 1106 can include a communication to utility container 242A that emulates a communication sent by client(s) (i.e. client(s) other than an identified suspicious client of clients 120A-120Z) that are continuing to communicate with container 142 to terminate traffic flow between the utility container 242A (which at block 1408 is provisioned to have a state in common with a state of container 142) and the client(s).

In one embodiment, the one or more emulated communication to host 140 sent at block 1106, can include one or more Killcx command to close a TCP connection.

At block 1107, manager system 110 e.g. by activating of traffic rules generating process 113 can generate traffic routing rules. In response to completion of block 1107, manager system 110 can proceed to block 1108. At block 1108, manager system 110 can send configuration data for receipt by firewall 130 at block 1303. The configuration data sent at block 1108 and received at block 1303 can include, e.g. configuration data provided by traffic routing rules data. Configuration data sent at block 1108 and received at block 1303 by firewall 130 can also include, e.g. configuration data to unblock traffic received from clients 120A-120Z. In response to receipt of the configuration data sent at block 1108, firewall 130 at block 1303 can update routing rules enforced by packet routing process 133 and can also configure packet blocking process 132 to unblock data traffic received from clients 120A-120Z. The updated routing rules can include, e.g. routing table updates so that incoming traffic to be handled by the newly instantiated utility container 242A is properly routed to the newly instantiated utility container 242A (which can be given a new IP address) and is not routed to container 142. Firewall 130 at block 1304 can return to block 1301 wherein firewall 130 can intercept received data traffic addressed to protected environment 102. During a subsequent iteration of routing block 1301, firewall 130 can enforce updated routing rules using the configuration data received at block 1303.

Figure 2:
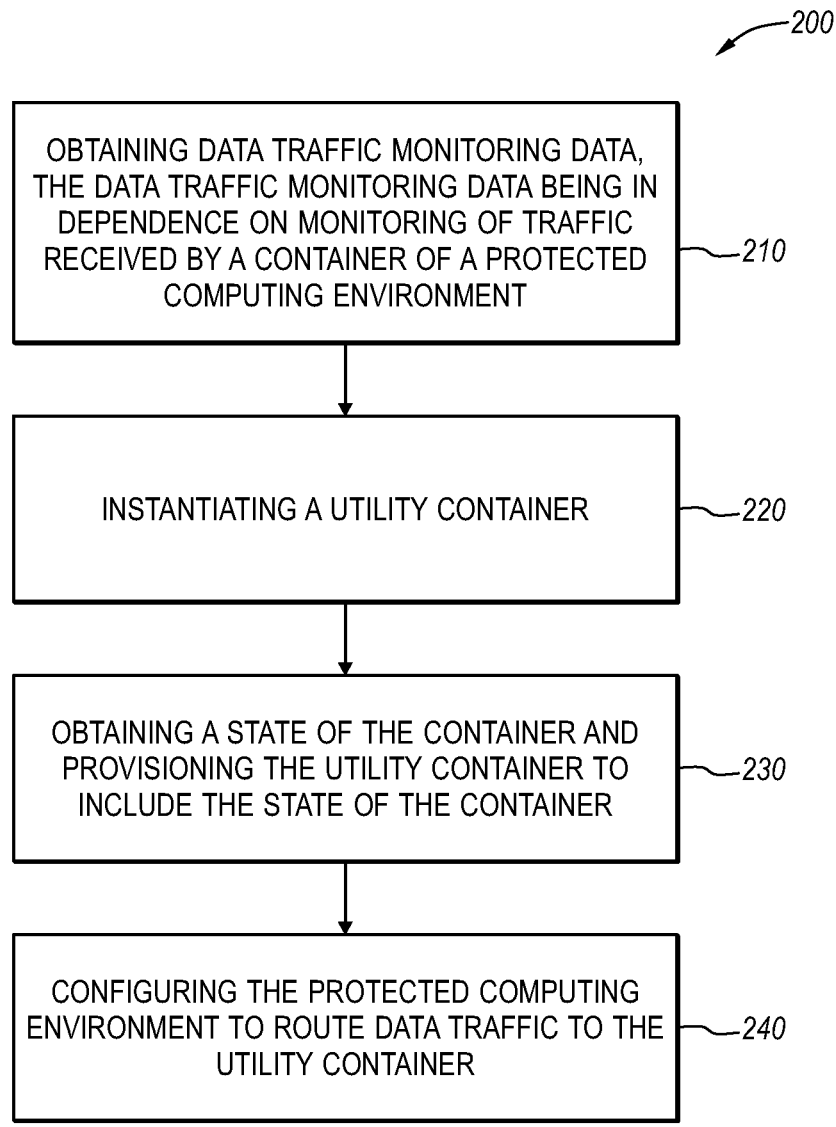
FIG. 2 is a flowchart depicting a method for performance by a system according to one embodiment.
Figure 4:
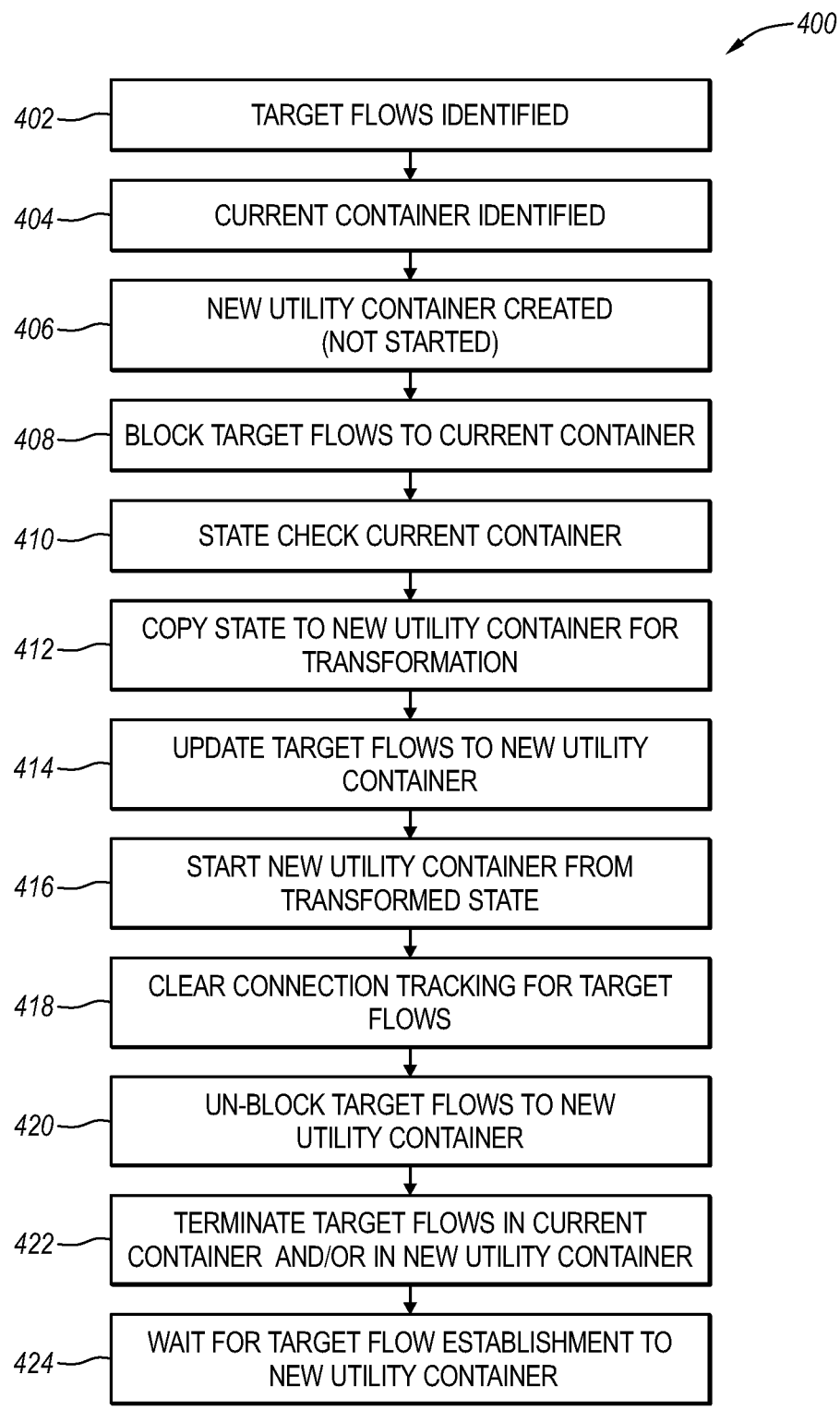
FIG. 4 is a flowchart depicting a method for performance by a system according to one embodiment.

FIG. 4 is a flowchart illustrating method 400, which is a method according to another example of method 200 set forth in the flowchart of FIG. 2. At block 402, target flows can be identified e.g. by running of monitoring process 144 by host 140. Monitoring process 144 run by host 140 can be internal to container 142 or external to container 142. Based on one or more criterion being determined to be satisfied by running of monitoring process 144, host 140 can send a communication to manager system 110 indicating that the one or more criterion has been satisfied. With the determination that one or more criterion has been satisfied, host 140 at block 404 can identify a container, e.g. container 142, for subjecting to utility container instantiation. With the communication indicating that one or more criterion has been satisfied, host 140 can include a container ID identifying a container for subjecting to utility container instantiation. The identified container can be the container 142 subject to data traffic monitoring for determining that one or more criterion has been satisfied.

At block 406, e.g. by commands initiated at manager system 110 and communicated to host 140, system 100 can instantiate a new utility container at block 406. The newly instantiated utility container 242A instantiated at block 406 can include at the time of instantiation an initial state. The initial state can be different than a state of container 142. At block 408 manager system 110 can send a communication to firewall 130 to activate packet blocking process 132 of firewall 130 so that traffic to container 142 and a new utility container 242A is blocked. The blocking of target flows at block 408 can assure that when the newly instantiated utility container instantiated at block 406 has started (block 416), it can have a state in common with container 142 (otherwise, without blocking target flows container and utility container states can become desynchronized).

At block 412, manager system 110 can send a communication to host 140 to copy and return state data specifying the state of container 142. State data can specify a state of container 142 and can include state data in respect to, e.g. process states, file states, socket states, connection states, and/or resource states. At block 412, manager system 110 can send a communication to host 140 so that the newly instantiated utility container 242A is provisioned to have a state in common with the state of container 142 at the time of state check block 410.

At block 414 manager system 110 can send a communication to firewall 130 to update target flows to the newly instantiated utility container 242A. The updates can include, e.g. routing table updates so that incoming traffic to be handled by the newly instantiated utility container 242A is properly routed to the newly instantiated utility container 242A (which can be given a new IP address) and is not routed to container 142.

At block 416, manager system 110 can send a communication to host 140 to start the newly instantiated utility container 242A from its transformed state, e.g. the state resulting from the provisioning occurring at block 412 to transform the state of the newly instantiated container to have a state in common with container 142.

At block 418 manager system 110 can send a communication to host 140 causing host 140 to clear a connection tracker for target flows. Host 140 can responsively clear a connection tracker of host 140 so that connections tracked are consistent with connections supporting the traffic migration.

At block 420 manager system 110 can send a communication to firewall 130 to deactivate packet blocking process 132 and to unblock target flows to container 142 and the newly instantiated utility container 242A.

At block 422, manager system 110 can send emulated communications to container 142 and utility container 242A that emulate communications sent by clients of clients 120A-120Z. The emulated communications can be communications to appropriately terminate traffic flows between containers 142 and 242A and respective clients of clients 120A-120Z no longer to be in communication with the respective containers, 142 and/or 242A according to a traffic migration.

At block 424, system 100 can wait for target flow to be established to utility container 242A. Based on functions of method 400 incoming traffic can be migrated so that a subset of incoming traffic is bifurcated and routed to the newly instantiated utility container 242A which subsequent to instantiating and prior to starting in one embodiment can provisioned to have a state in common with the state of container 142 at block 410.

Embodiments herein recognize that a client-server architecture can include a single or small set of end-hosts providing an application service to many simultaneous remote clients (e.g. web server, VoIP server, chat server, etc.). This type of architecture can be the target of cyber-attacks because degrading or denying access to a few select targets (e.g. servers) can cause a dramatic impact on user performance (clients who can no longer connect to the server or receive reasonable throughput or application performance at the server). Many of these attacks, in particular low volume DDoS, can cause degradation and denial effects by causing connections or traffic flows using messages that exploit design factors in the server application or protocol which can cause a server to become resource overloaded.

Embodiments herein recognize that because services are often run on a host e.g. a bare-metal machine host or a virtual machine (VM) host (e.g. hypervisor based) with a finite amount of memory/sockets/CPU cycles, file descriptors etc., attacks such as DDoS attacks can render a host useless.

There is set forth herein in one embodiment a system 100 that can be used to address attacks such as those described, and which can advantageously provide for traffic migration for any purpose. For example, as a result of monitoring by monitoring process 144 certain clients of client 120A-120Z can be determined to be prioritized clients and traffic can be migrated to newly instantiated container(s), the newly instantiated container(s) having controlled and limited resources so that prioritized clients are provided with a prioritized level of service. System 100 set forth herein can provide for live migration of traffic flows within a host 140. In one embodiment, host 140 can be configured to run an application service for access by clients 120A-120Z on container 142 that is instantiated on host 140. Host 140 in one embodiment can be provided by a bare metal machine host (physical computer system), e.g. a computer system 500 as set forth in FIG. 6 without virtualization hardware. Host 140 in one embodiment can be provided by a virtual machine (VM) defined by a hypervisor based virtual machine that runs on a hypervisor, which hypervisor can run on a computer system 500 having an associate operating system (OS).

In one embodiment, container 142 which can run service application 143 can run monitoring process 144. Monitoring process 144 in one embodiment can determine whether one or more criterion has been satisfied, e.g. can recognize when certain flows/connections are suspicious and may be contributing towards a cyber-attack. Monitoring process 144 in one particular example of such embodiment can detect for a Slowloris DoS attacks wherein requests to a host are designed to prolong socket open periods of a host. Such an attack can be monitored for by examining port open periods and determining that a suspicious data traffic criterion has been satisfied where more than a threshold percentage of client requests have resulted in port open periods of longer than a threshold. According to another one or more criterion that can be monitored for, monitoring process 144 can determine that a loading of host 140 has become imbalanced, e.g. has exceeded threshold loading at container 142. According to another one or more criterion that can be monitored for data traffic can be monitored for indicators a traffic attributable a certain type of client message activity preferred by an enterprise operating host 140. In such an example, as a result of monitoring by monitoring process 144 certain clients of client 120A-120Z can be determined to be prioritized clients and traffic can be migrated to newly instantiated container(s) with controlled and limited resources so that prioritized clients are provided with a prioritized level of service.

In response to detecting that one or more criterion has been satisfied, system 100 can run state checking process 112 to determine the state of container 142, can instantiate a new container e.g. utility container 242A which initially can be a clone of container 142 in one embodiment, and then can perform one or more function to adjust the process state in both container 142 and utility container 242A so that (in the case the one or more criterion includes detection of suspicious traffic) only non-suspect benign flows in one embodiment remain serviced in container 142 while suspicious flows are separated and partitioned for servicing by utility container 242A.

In one embodiment, system 100 can control and limit the resources of the responsively instantiated utility container 242A so that (in the case the one or more criterion includes detection of suspicious traffic) the attack is not permitted to overwhelm the entire host 140, preserving sufficient resources for the original benign container provided by container 142. The responsively instantiated utility container 242A (in the case the one or more criterion includes detection of suspicious traffic) can optionally be subject to further analysis to assess whether the suspicious flows are part of an attack. In one embodiment, an instantiated utility container 242A can be instantiated to run a traffic examination process to examine data traffic flows in the responsively instantiated utility container 242A to return decisions regarding a suspected attack and/or to send one or more communication to deceive the attacker into thinking the attack is successful.

System 100 can be configured to support live intra-host migration in a cascading fashion. For a container 142 running a service application 143, system 100 can instantiate a plurality of utility containers 242A-242Z simultaneously, contemporaneously, or successively. System 100 can instantiate the plurality of utility containers 242A-242Z simultaneously within the host 140 in which container 142 is instantiated. In one embodiment system 100 can instantiate a new container of utility containers 242A-242Z for each new one or more criterion determined to be satisfied by running of monitoring process 144. For each new utility container of utility containers 242A-242Z instantiated, system 100 can perform such functions as (a) run state checking process 112 to check the state of container 142, (b) provision the newly instantiated utility container of utility containers 242A-242Z so that the state of container 142 is transferred to the newly instantiated utility container, (c) send emulated communications emulating communications from specified one or more clients to a container (container 142 or a utility container 242A) to terminate traffic flow between the container that the specified one or more client, and (d) update packet routing process 133 of firewall 130 so that responsively to one or more criterion being determined to be satisfied by running of monitoring process 144, system 100 migrates incoming traffic from one or more client of clients 120A-120Z so that the incoming traffic from the one or more client of clients 120A-120Z is received by a new utility container of utility containers 242A-242Z rather than container 142. Host 140 can support hundreds to thousands of simultaneous containers.

In one embodiment system 100 can perform utility container instantiating, container state checking, and utility container state provisioning with use a container software utility such as DOCKER™ (Docker is a trademark of Docker, Inc.). In one embodiment, system 100 can use customized extensions of the CRIU (checkpoint and restore) functions of the DOCKER™ container software utility for performance of functions of state checking process 112 (FIG. 1) (block 1104 of FIG. 3) and utility container provisioning (block 1408 of FIG. 3) set forth herein. In one embodiment, system 100 can use a checkpoint CRIU function for performance of state checking process 112 (FIG. 1) (block 1104 of FIG. 3) and can use a restore CRIU function for performance of utility container provisioning (block 1408 of FIG. 3) set forth herein. In one embodiment, system 100 can use customized extensions of LXC functions for performance of functions of state checking process 112 (FIG. 1) (block 1104 of FIG. 3) and utility container provisioning (block 1408 FIG. 3) set forth herein. In one embodiment, UBUNTU® container software utility can be utilized (UBUNTU® is a registered trademark of Canonical Ltd). In one embodiment, system 100 can use an LXC snapshot function for performance of state checking process 112 (FIG. 1) (block 1104 of FIG. 3) and can use an LXC restore function for performance of utility container provisioning (block 1408 of FIG. 3) set forth herein. Other container based VMs that can be utilized include e.g. SOLARIS® containers (SOLARIS® is a registered trademark of Oracle Corporation), ICORE® VIRTUAL ACCOUNTS®, (ICORE® and VIRTUAL ACCOUNTS® are registered trademarks of iCore Software, Inc.), VIRTUOZZO® containers (VIRTUOZZO® is a registered trademark of Virtuozzo International Gmbh).

In one embodiment, system 100 can perform updating one or more routing table of firewall 130 used by packet routing process 133, with use, e.g. of the IPtables command line utility for configuring a LINUX® kernel firewall implemented within the Netfilter project System 100 can use virtualization to support the bifurcation of network flows at runtime and the transfer of process state within the same host 140. Embodiments herein, e.g. with use of container software utility functions can move state from one container to another seamlessly without interruption to the connection or causing noticeable client interruption. Migration can be performed internal to a common host 140, e.g. system 100 can instantiate a new one or more utility container within a host 140 having container 142A running application service 143 and traffic can be migrated to the new one or more newly instantiated utility container that also runs the application service 143. Embodiments herein can address complexities of internal migration with an implementation that can manage common application state (ports, application memory state, etc.).

In one embodiment system 100 can use a CRIU checkpoint function to save the state of a container e.g. container 142. State data defining a state of a container can include e.g. data that specifies process state, file state, open socket state, connection state, and/or resource state. System 100 can use the state data to transfer the state of container 142 to a new utility container at a later time.

Functionalities set forth in reference to FIGS. 1B, 2, 3, and 4 described as being performed by a container (container based virtual machine) can alternatively be performed by an alternative type of processing resource. The alternative processing resource can be provided, e.g. by computer system 500 (physical computer system) or a virtual machine provided by a hypervisor based virtual machine. Referring to the flowchart of FIG. 3, embodiments herein recognize that the processing resource performing the function of a utility container described in FIG. 3 can be instantiated in response to detecting that one or more criterion has been satisfied (block 1405) or can be preexisting the detecting that one or more criterion has been satisfied (block 1403). For example, functionality of a utility container described with reference to the flowchart of FIG. 3 can be provided by a pre-instantiated virtual machine, e.g. container based or hypervisor based, running on host system 40 (FIG. 1). According to one embodiment host system 40 can include a designated one or more computer system 500 (physical computer system) for performing functions of a utility container as set forth herein.

Figure 5:
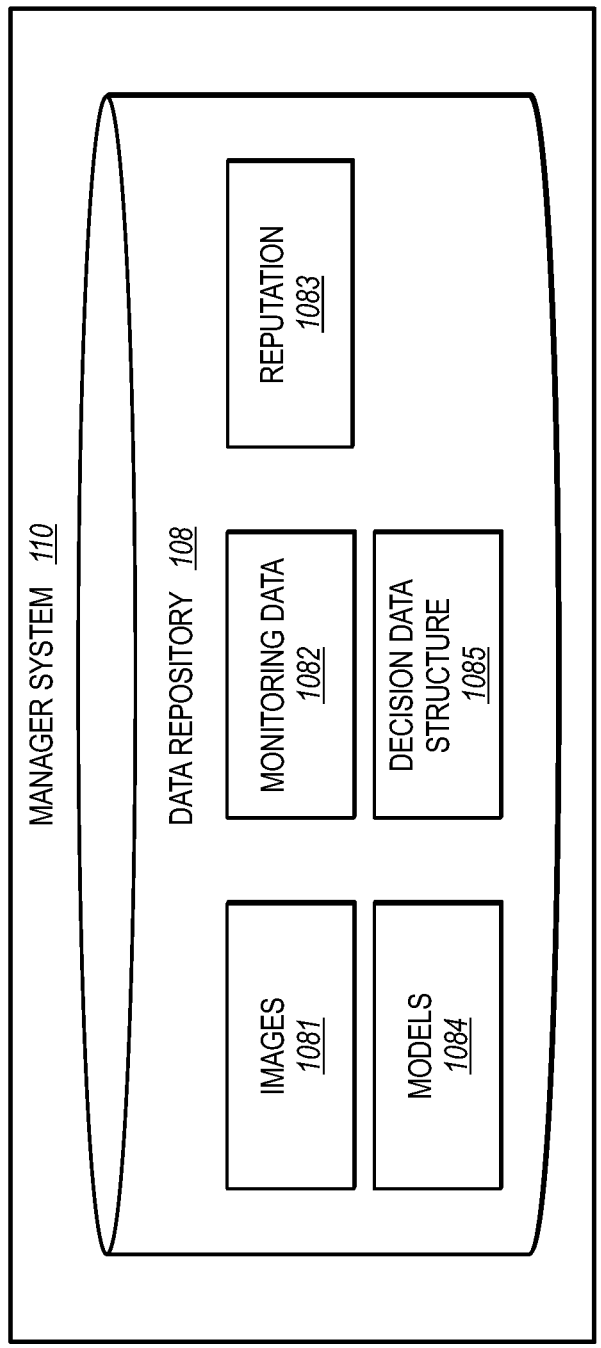
FIG. 5 is a schematic block diagram illustrating a manager system of a computing environment according to one embodiment.

While utility processing resources 42A-42Z as set forth in FIG. 1A can be preexisting, advantages can be yielded by providing processing resources 42A-42Z to be instantiated on demand as in the case described with reference to the flowchart of FIG. 3. Providing utility processing resources 42A-42Z on demand can reduce overall resource consumption and can avoid the undertaking of grooming processes to remove outdated utility processing resources.

Where manager system 110 instantiates a virtual machine to provide a processing resource or a utility processing resource manager system 110 can use images of images area 1081 of data repository 108 as shown in FIG. 5 for instantiation of the virtual machines. Data repository 108 of manager system 110 can include images area 1081 storing virtual machine images, e.g. container based and/or hypervisor based for use in the instantiation of virtual machines. According to one embodiment, manager system 110 and data repository 108 can store in images area 1081 one or more virtual machine image for each one or more criterion detected for.

As set forth herein, host system 40 according to one embodiment can include M instances of processing resource 42, one for each of M different service applications. The M different service applications can include, e.g. a web service application, a Session Initiated Protocol (SIP) application, a chat application and numerous other types of service applications. The virtual machine images stored in images area 1081 can be provided, e.g. in relative heavyweight form, wherein respective images of the virtual machine images include content for instantiation of multiple ones of and possibly each of the M applications, or alternatively can be provided in relatively lightweight form, wherein respective virtual machine images of images area 1081 include content for instantiation of a single one of the M applications on instantiation of a virtual machine. Where provided in the former relatively heavyweight form data repository 108 can store fewer virtual machine images in images area 1081 to yield reduced bookkeeping costs. Where provided in the later relatively lightweight form, data repository 108 can store a larger number of virtual machine images but the respective virtual machine images when instantiated can be instantiated more quickly with reduced resource consumption relative to a virtual machine instantiated with use of a virtual machine image provided in a relatively heavyweight form. In some embodiments, data repository 108 can store a combination of relatively heavyweight virtual machine images having content for instantiation of multiple ones of the M applications and relatively lightweight virtual images. In some embodiment, manager system 110 can generate virtual machine images for instantiation of a virtual machine on an on-demand basis in response the detection of one or more criterion being satisfied.

With further reference to data repository 108 as shown in FIG. 5, data repository 108 can include monitoring data area 1082 for storing monitoring data. Monitoring data area 1082 can include data returned by running of monitoring process 144. The monitoring data can include historical monitoring data, e.g. including expired session data from past and/or current instances of processing resource 42 and can include current monitoring data e.g. including live session data from a current instance of processing resource 42.

With further reference to data repository 108 as shown in FIG. 5, data repository 108 can include reputation area 1083 for storing reputation data. Reputation area 1083 can include reputation data returned by examining monitoring data of monitoring data area 1082. Reputation area 1083 can store for respective client IP addresses obtained by system 100 reputation scores. The reputation scores can be iteratively updated during the deployment period of system 100.

Figure 6:
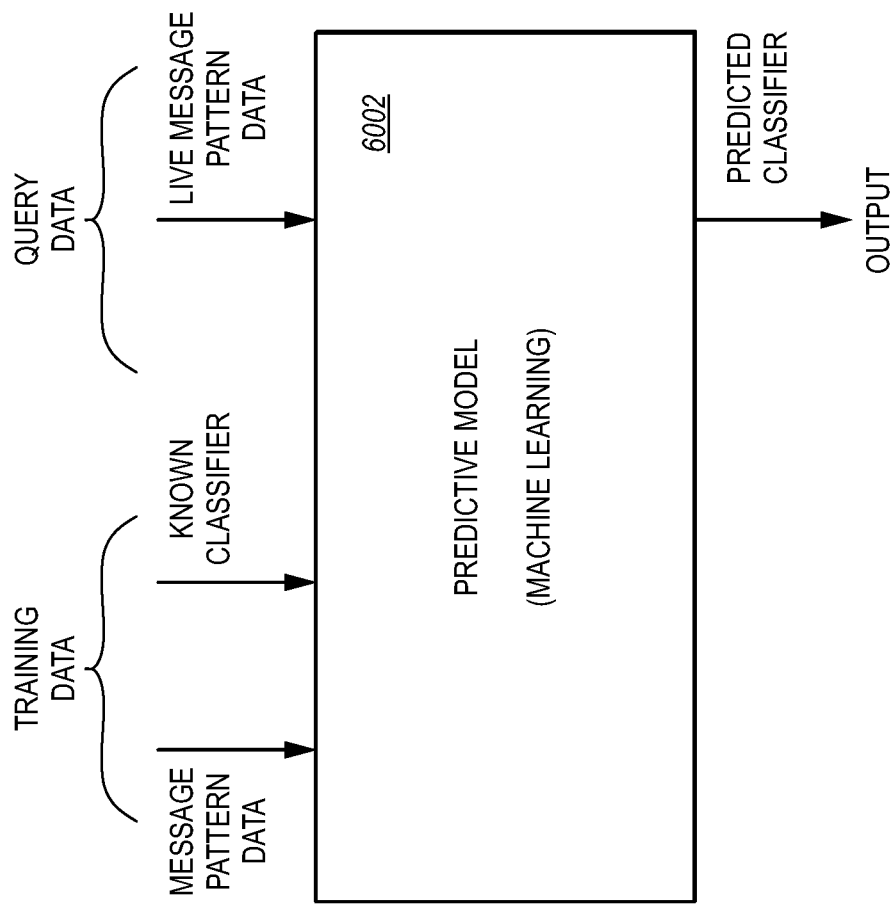
FIG. 6 depicts a predictive model according to one embodiment.

With further reference to data repository 108 as shown in FIG. 6, data repository 108 can include models area 1084 for storing predictive models. Predictive models stored in models area 1084 can include predictive models trained by machine learning. Predictive models stored in models area 1084 can include one or more predictive model for use in predicting e.g. whether a message pattern is indicative of a threat or benign.

Data repository 108 can also include decision data structures area 1085 for storing decision data structures for use in returning of action decisions. Action decisions can include action decisions for selection of a certain utility processing resource for provisioning and for migration of traffic in response to detection that a certain one or more criterion has been satisfied.

According to one embodiment, manager system 110 can be configured to return action decisions with use of a decision data structure as set forth in Table A.

With reference to the flowchart of FIG. 3, host system 40 at block 1404 can send a communication to manager system 110 indicating that one or more criterion has been satisfied. With use of the decision data structure as shown in Table A, manager system 110 can return differentiated action decisions in dependence on which of N different one or more criterion has been detected. With use of the decision data structure of Table A, manager system 110 can be configured so that manager system 110 can provision a different utility processing resource for migration of data traffic in dependence on one or more criterion has been detected.

Referring to the decision data structure of Table A, differentiated one or more criterion can be detected and different utility processing resources which can be provisioned and used for traffic migration. Referring to the decision data structure of Table A, Rows 1, 2, and 3 the one or more criterion associated with Rows 1, 2, and 3 are one or more criterion wherein suspicious traffic is detected for. Referring to Row 1, the one or more criterion detected for can be that more than a threshold percentage of client requests received at a processing resource 42 have port open periods of longer than a threshold period. The associated action decision can specify the provisioning of utility processing resource 42A to include the state of processing resource 42 and migrate traffic from first clients to utility processing resource 42A. The first clients referred to in Row 1 can be clients associated to the port open periods of longer than the threshold period.

Referring to Row 2 of the decision data structure of Table A, the one or more criterion detected for at block 1403 of the flowchart of FIG. 3 can be that more than a threshold percentage of client requests received at processing resource 42 have message patterns classified as anomalous. For

TABLE A

| Row | One or more criterion detected | Action decision |
|---|---|---|
| 1 | more than a threshold percentage of client requests received at processing resource 42 have resulted in port open periods of longer than a first threshold | Provision utility processing resource 42A to include state of processing resource 42 and migrate traffic from first clients to utility processing resource 42A |
| 2 | more than a threshold percentage of client requests received at processing resource 42 have message patterns classified as anomalous | Provision utility processing resource 42B to include state of processing resource 42 and migrate traffic from first clients to utility processing resource 42B |
| 3 | more than a threshold percentage of currently connected clients connected to processing resource 42 have reputation scores below a low threshold | Provision utility processing resource 42C to include state of processing resource 42 and migrate traffic from first clients to utility processing resource 42C |
| 4 | more than a threshold percentage of currently connected clients connected to processing resource 42 have reputation scores above a high threshold | Provision utility processing resource 42D to include state of processing resource 42 and migrate traffic from first clients to utility processing resource 42D |
| 5 | more than a threshold percentage of currently connected clients connected to processing resource 42 have IP addresses flagged as preferred | Provision utility processing resource 42E to include state of processing resource 42 and migrate traffic from first clients to utility processing resource 42E |
| 6 | One or more loading parameter value of processing resource 42 has exceeded a threshold | Provision a select utility processing resource out of candidate resources 42F-42F(n) to include state of processing resource 42 and migrate traffic from first clients to the selected utility processing resource; the selected utility processing resource can be selected in dependence on loading conditions. |
| ... ... | ... | classifying incoming message patterns as anomalous, manager system 110 can use predictive model 6002 as set forth in FIG. 6.

Predictive model 6002 can be trained using supervised machine learning processes by iteratively applying training data to predictive model 6002. Predictive model 6002 once trained can be configured to respond to query data. Iteratively applied training data applied to predictive model 6002 can include iteratively applied training message pattern data associated with known classifiers for the iteratively applied training message pattern data. The iteratively applied training message pattern data can be message pattern data known to represent a non-anomalous or alternatively anomalous flow of messages with respect to a service application 143 being run by processing resource 42. The known classifier associated to training message pattern data can be data that specifies that the training message pattern data is non-anomalous or alternatively anomalous and can include in some use cases, additional classifiers, e.g. a classifier specifying a particular type of threat associated to the training message pattern data where the applied training message pattern data is associated to a certain type of threat.

In the particular example where processing resource 42 defines a session initiated protocol (SIP) server, examples of a non-anomalous pattern can include e.g. the messaging sequence "invite", "trying", "ringing", "ok" according to one use case. Anomalous messaging patterns can include e.g. (i) a messaging sequence of "invite", "trying", "ringing", "ringing", "ringing", "ringing" . . . ; (ii) a chain of forwarded messages between first, second, and additional one or more clients (indicative of a forwarding threat); (iii) a message returned back to multiple clients (indicative of an amplification (reflection) threat).

Predictive model 6002 once trained by application of iteratively applied training data can be configured to respond to query data. The applied queried data can be live message pattern data which can be received and accumulated at block 1401 of the flowchart of FIG. 3. In response to receiving query data, predictive model 6002 can return classifiers defined by predicted classifiers for incoming live message pattern data associated to respective clients 120A-120Z. Returned classifiers returned from predictive model 6002 for incoming live message pattern data can include such classifiers as e.g. as (a) "non-anomalous" and (b) "anomalous". Returned classifications of "anomalous" can have associated therewith further threat specific classifiers such as Threat=Threat001; Threat=Threat002; and the like.

Referring to Row 2 of the decision data structure of Table A, manager system 110 can fire Row 2, where the one or more criterion is satisfied that more than a threshold percentage of client requests received at processing resource 42 have message patterns classified as anomalous. The action decision associated to Row 2 can be the action decision to provision utility processing resource 42B to include a state of processing resource 42 and to migrate traffic from first clients to utility processing resource 42B. The first clients referred to in Row 2 can be clients associated to the detected anomalous message pattern data.

Figure 7:
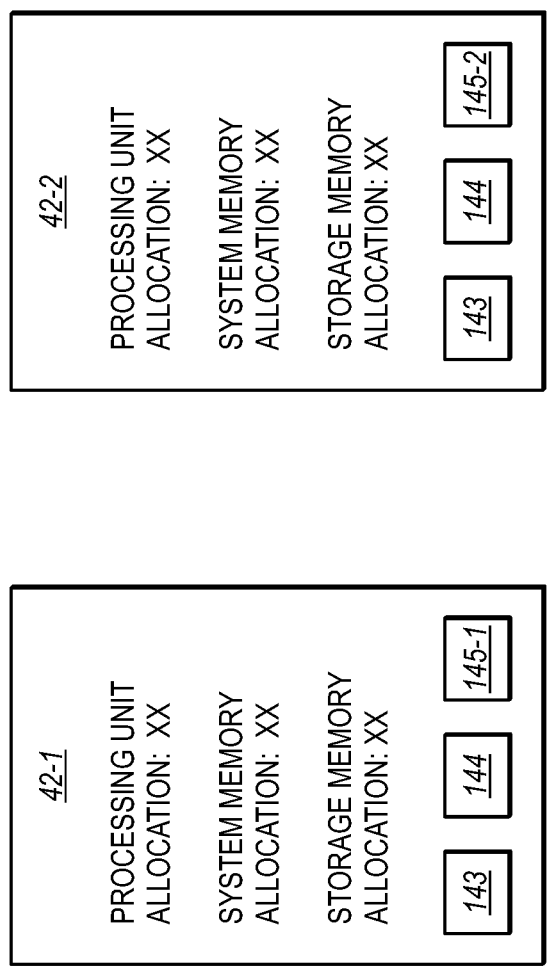
FIG. 7 is a schematic diagram depicting differentiated processing resources according to one embodiment.

Any first and second ones of processing resources herein (e.g. utility processing resource 42A and utility processing resource 42B) or another first and second set of processing resources (which may or may not be utility processing resources) can be differentiated as described in FIG. 7.

FIG. 7 depicts first processing resource 42-1 and second processing resource 42-2 which can refer any first and second different processing resources of system 100 such as utility processing resource 42A and utility processing resource 42B. The first and second different processing resources can be differentiated, e.g. in terms of having (a) differentiated processing unit allocations; (b) differentiated system memory allocations; and/or (c) differentiated storage memory allocations. The first and second differentiated processing resources 42-1 and 42-2 which can refer to first and second differentiated utility processing resources 42A and 42B can include and run common service application 143 as described in connections with FIGS. 1A and 1B, i.e. the service application running on processing resource 42 (FIG. 1A) and container 142 (FIG. 1B) and can also run common monitoring process 144, i.e. the monitoring process 144 running on the system 40 as described in FIG. 1A and in the specific embodiment of FIG. 1B running on host 140.

The first and second different processing resources 42-1 and 42-2 can run differentiated auxiliary processes. As depicted in FIG. 7, processing resource 42-1 can run auxiliary process 145-1 and processing resource 42-2 can run auxiliary process 145-2 differentiated from auxiliary process 145-1.

Referring to the decision data structure of Table A, utility processing resource 42A provisioned in response to the one or more criterion of Row 1 being fired, can run a first auxiliary process 145-1 while utility processing resource 42B provisioned in response to the one or more criterion of Row 2 being fired, can run auxiliary process 145-2. The first auxiliary process 145-1 associated to utility processing resource 42A can include a diagnostic process for further characterization of port open periods. The second auxiliary process 145-2 associated to utility processing resource 42B can include a diagnostic process for further characterization of message patterns.

First auxiliary process 145-1 running on utility processing resource 42A according to one embodiment can perform processing for suspicious port open period detection that is more expansive than suspicious port open period detection performed by monitoring process 144 which can be run on processing resource 42 and utility processing resource 42A. For example, suspicious port open period detection performed by monitoring process 144 can be relatively lightweight and can include for example system 100 examining of flow data, e.g. flow data indicating that flow is active or inactive, flow data indicating a rate of flow. Suspicious port open period detection performed by first auxiliary process 145-1 can be relatively heavyweight and can include examination of kernel level data such as system call data. Models area 1084 of data repository 108 can store a predictive model trained by machine learning training data in the manner described with reference to FIG. 6 except trained with applied training data to recognize (a) non-anomalous system call patterns and (b) anomalous system call patterns associated to malicious attack associated to detected threshold exceeding port open periods. System call examination for suspicious port open period detection can also or alternatively be performed by monitoring process 144.

Second auxiliary process 145-2 running on utility processing resource 42B according to one embodiment can perform processing for anomalistic message pattern detection that is more expansive than anomalistic message pattern detection performed by monitoring process 144 which can be run on processing resource 42 and utility processing resource 42A. For example, anomalistic message pattern detection performed by monitoring process 144 can be relatively lightweight and can include for example system 100 examining message order data that specified an order of messages. Anomalistic message pattern detection performed by second auxiliary process 145-2 can be relatively heavyweight and can include examination of kernel level data such as system call data. Models area 1084 of data repository 108 can store a predictive model trained by machine learning training data in the manner described with reference to FIG. 6 except trained with applied training data to recognize (a) non-anomalous system call patterns and (b) anomalous system call patterns associated to detected anomalistic message patterns. System call examination for anomalistic message pattern detection can also or alternatively be performed by monitoring process 144.

According to one embodiment, system 100 can be configured to provide and iteratively update reputation scores for respective clients 120A-120Z, which clients 120A-120Z can be associated to respective IP addresses. According to one embodiment, system 100 at block 1402 (FIG. 3) can update reputation scores for clients 120A-120Z in response to received traffic. Iteratively updated reputation scores can be stored in reputation area 1083 of data repository 108. System 100 according to one embodiment can return a reputation score for a respective client of clients 120A-120Z using Eq. 1 as follows.

$$P = F_1 W_1 + F_2 W_2 \tag{Eq. 1}$$

Where P is the reputation score for an individual client of clients 120A-120Z, $F_1$ is a first factor, $F_2$ is a second factor, and $W_1$-$W_2$ are weights associated respectively to the first and second factors. According to one embodiment the first factor, $F_1$, can be a socket demand factor in dependence on the performance of a client over time in respect to port demands of the client. Instances where a request of the client has resulted in a port open period exceeding a threshold can be flagged as "events" that lower a client's score under factor $F_1$. According to one embodiment, the second factor, $F_2$, can be a message pattern factor in dependence on performance of a client over a deployment period in terms of message pattern generation by the client. According to one embodiment, message pattern anomalies detected using predictive model 6002 of FIG. 6 can be flagged as events which can lower the client's score under factor $F_2$. Returning to the flowchart of FIG. 3, monitoring block 1402 can include monitoring to determine an impact of incoming traffic of the respective reputations of connected clients. Eq. 1 can have additional or fewer factors with associated weights.

Referring to Row 3 of the decision data structure of Table A, the one or more criterion associated with Row 3 is the one or more criterion that more than a threshold percentage of currently connected clients connected to processing resource 42 have reputation scores below a low threshold. In response to the one or more criterion of Row 3 being satisfied, manager system 110 using the decision data structure of Table A can provision utility processing resource 42C to include a state of processing resource 42 and can migrate traffic from first clients to utility processing resource 42C. The first clients can be the currently connected clients having reputation scores below the low threshold.

According to one embodiment, monitoring process 144 which can be run internal and/or external to processing resource 42 (FIG. 1A) can include processing performed by host system 40 to iteratively update reputation scores for clients 120A-120Z using system 100 based on currently received traffic.

With reference to Rows 1, 2, and 3, system 100 featured as set forth herein can be used to quarantine suspect traffic including by migrating traffic determined to be suspicious to one or more utility processing resource such as utility processing resource 42A associated to Row 1, utility processing resource 42B associated to Row 2, and utility processing resource 42C associated to Row 3.

According to one embodiment, a utility processing resource such as utility processing resource 42A, 42B, or 42C provisioned in response to suspicious traffic being detected can be configured so that subsequent to migration of traffic to the utility processing resource, the utility processing resource sends a communication to one or more client to deceive the one or more client to determining that an attack of the one or more client has been successful. According to one embodiment, a processing resource 42A, 42B, 42C, can be configured to include reduced resources. A utility processing resource 42A, 42B, 42C can be configured to have a fixed number of ports, sockets and threads that are in dependence on a processing unit allocation for the utility processing resource. According to one embodiment, a processing unit resource allocation for utility processing resource 42A, 42B, 42C can be provided so that the utility processing resource 42A, 42B, 42C is more likely to send a service unavailable response message to a connected client than in the case of traffic being handled by processing resource 42. A processing resource herein can be configured to be more likely to send a service unavailable message by configuring the processing resource to include a reduced processing unit allocation. According to one embodiment a number of messages that can be handled concurrently by a processing resource can be dependent on a number of available ports which can be dependent on a processing unit allocation for the processing resource. Messages that cannot be processed currently can be scheduled and saved to a message queue of fixed size. A processing resource can send a service unavailable response message when a message queue has over-filled and the processing resource cannot schedule an incoming request. Accordingly, embodiments herein recognize that reducing a processing unit allocation for a processing resource can increase the likelihood of the processing resource sending a service unavailable message to a connected client.

For providing the described functionality, utility processing resource 42A, 42B, 42C for handling migrated suspicious traffic can be configured to have a reduced processing unit allocation relative to a processing unit allocation associated to processing resource 42. According to one embodiment a processing unit allocation for utility processing resource 42A, 42B, 42C can be less than about 50% of the processing unit allocation for processing resource 42. According to one embodiment a processing unit allocation for utility processing resource 42A, 42B, 42C can be less than about 40% of the processing unit allocation for processing resource 42. According to one embodiment a processing unit allocation for utility processing resource 42A, 42B, 42C can be less than about 30% of the processing unit allocation for processing resource 42. According to one embodiment a processing unit allocation for utility processing resource 42A, 42B, 42C can be less than about 20% of the processing unit allocation for processing resource 42. According to one embodiment a processing unit allocation for utility processing resource 42A, 42B, 42C can be less than about 10% of the processing unit allocation for processing resource 42. According to one embodiment a processing unit allocation for utility processing resource 42A, 42B, 42C can be about 1.0 processing unit or less. According to one embodiment a processing unit allocation for utility processing resource 42A, 42B, 42C can be about 0.5 processing units or less. According to one embodiment a processing unit allocation for utility processing resource 42A, 42B, 42C can be about 0.3 processing unit or less.

According to one embodiment a processing unit allocation for utility processing resource 42A, 42B, 42C can be about 0.1 processing unit or less.

According to one embodiment a processing unit allocation for utility processing resource 42A, 42B, 42C can be such that the utility processing resource is not resourced to substantively handle traffic loading, but is resourced so that it fails to handle traffic loading and responsive to traffic loading failure sends system generated failure messages, e.g. service unavailable messages, wherein the system generated messages are not spoofed messages but result from system overload, e.g. message queue overfill.

Embodiments herein recognize that even where an under resourced utility processing resource herein does not send failure message, the under resources utility resource can deceive a malicious client into determining that an attack has been successful. For example, a malicious attacker client can be monitoring at a client end traffic flow data and can determine from increased latencies in traffic flow that an attack has been successful.

Embodiments herein recognize that while under resourcing utility processing resources 42A, 42B, 42C referred to in Row 1, 2, and 3 can provide advantages, advantages can accrue according to some use cases by configuring utility processing resources 42A, 42B, 42C referred to in Row 1, 2, and 3 to be significantly resourced. According to one embodiment, utility processing resources 42A, 42B, 42C can be configured to have processing unit allocations that are increased relative to a processing unit allocation associated to processing resource. For example, according to one policy that may be active, an enterprise that operates system 100 can place a premium on continuing to service legitimate clients which have been identified as sending suspicious traffic. By over-resourcing utility processing resources 42A, 42B, 42C to have processing unit allocations that are increased relative to a processing unit allocation associated to a processing resource an enterprise can increase the likelihood that legitimate clients which are migrated continue to receive an acceptable level of service in spite of increased processing unit demands of migrated malicious client. By over-resourcing utility processing resources 42A, 42B, 42C to have processing unit allocations that are increased relative to a processing unit allocation associated to a processing resource utility processing resource 42A, 42B, 42C can run an auxiliary process 145-2 provided by e.g. a heavyweight diagnostic process to identify legitimate clients who have been identified as clients sending suspicious traffic. Over-resourcing utility processing resources 42A, 42B, 42C to have processing unit allocations that are increased relative to a processing unit allocation associated to a processing resource can facilitate in some embodiments additional or alternative processing such as processing involving examination of system calls as set forth herein.

With reference to Rows 1, 2, and 3, system 100 featured as set forth herein can be used to quarantine suspect traffic including by migrating traffic determined to be suspicious to one or more utility processing resource. Features of system 100 can also be used to provide to clients an enhanced level of service. According to some use cases, traffic of certain clients can be migrated to a utility processing resource that is configured to provide an enhanced level of service.

Referring to Row 4, the one or more criterion associated to Row 4 is the one or more or more criterion that more than a threshold percentage of currently connected clients connected to processing resource 42 have reputation scores above a high threshold. As noted, with reference to Row 3, system 100 e.g. at block 1402 of the flowchart of FIG. 3 can iteratively update reputation scores associated to clients based on incoming traffic.

Referring to Row 4, system 100 in response to the detection that more than a threshold percentage of currently connected clients connected to processing resource 42 have reputation scores above a high threshold can provision utility processing resource 42D to include a state of processing resource 42 and can migrate traffic from first clients to utility processing resource 42. The first clients that can be migrated as referenced in Row 4 can be currently connected clients having current reputation scores above the high threshold.

Referring again to FIG. 7, utility processing resource 42D referenced in FIG. 4 can have resource allocations that are enhanced in reference to resource allocations for processing resource 42. The different processing resources can be differentiated in the manner described in reference to FIG. 7 in respect to processing resource 42-2 and processing resource 42-1.

Referring to FIG. 7, processing resource 42D provisioned in accordance with the action decision of Row 4 can include one or more of (a) increased processing unit allocation in reference to processing resource 42, (b) increased system memory allocation in reference to processing resource 42, or (c) increased storage memory allocation in reference to processing resource 42.

With the enhanced one or more resource allocations described, utility processing resource 42D can provide an enhanced quality of service (QoS) relative to clients which are not migrated to utility processing resource 42D. QoS can be measured in terms of e.g. packet loss, a bit rate, throughput, transmission delay, and/or availability.

Referring to Row 5 of the decision data structure of Table A, the one or more criterion associated with Row 5 in the embodiment described is the one or more criterion that more than a threshold percentage of currently connected clients connected to processing resource 42 have IP addresses flagged as "preferred". On the deployment of system 100 and/or after deployment, various IP addresses may be known from system administrator user of system 100. A list of preferred IP addresses can be manually generated, or alternatively generated in response to processing, or can be partially generated manually and partially generated in response to processing. Preferred IP addresses can include, e.g. those associated to known "friendly" nodes, e.g. operated by the entity that operates system 100, that will interact with processing resource 42 during a deployment period of processing resource 42.

Preferred IP addresses can also include, e.g. IP addresses associated to registered users of system 100. In some use cases, processing resource 42 running service application 143 can provide services to different classes of users which classes of users can include guest users and registered users. Registered users can undergo an authentication process prior to being registered. Based on the authentication and registration the addresses of clients associated to registered users can be included on a list of preferred IP addresses.

Referring to Row 5, processing resource 42 on initial deployment can have a limited number of connections to IP addresses flagged as preferred on a list of preferred IP addresses. Over time, the percentage of connections from preferred IP addresses can increase. In accordance with Row 5, system 100 can detect that one or more criterion triggering provisioning of utility processing resource 42E has occurred when more than a threshold percentage of currently connected clients connected to processing resource 42 have IP addresses flagged as preferred. Utility processing resource 42E referred to in Row 5, in the manner of utility processing resource 42D described in reference to Row 4 can have one or more resource allocation enhanced relative to a resource allocation associated to processing resource 42.

With the enhanced one or more resource allocations described, utility processing resource 42E can provide an enhanced quality of service (QoS) relative to clients which are not migrated to utility processing resource 42E. QoS can be measured in terms of e.g. packet loss, a bit rate, throughput, transmission delay, and/or availability.

Referring to Row 6, the one or more criterion associated with Row 6 is that one or more loading parameter value of processing resource 42 has exceeded a threshold. Various IT management systems can be utilized for return of loading parameter values indicating loading of processing resource 42. As indicated with reference to FIG. 7, processing resources 42 of system 100 can include associated resource allocations, e.g. in terms of processing unit resource allocation, a system memory resource allocation, and/or a storage memory resource allocation. A returned loading parameter value returned by processing resource 42 that indicates a loading of processing resource 42 can include, e.g. (i) a processing unit utilization parameter value; (ii) a system memory utilization parameter value; and/or (iii) a system memory utilization parameter value.

The action decision associated with Row 6 can be an action decision to provision a selected utility processing resource out of candidate resources 42F-42F(n) to include a state of processing resource 42 and to migrate traffic from first clients to the selected utility processing resource. The selected utility processing resource can be selected in dependence on loading conditions as indicated by the one or more loading parameter value that has triggered the firing of Row 6. The firing of Row 6 according to one embodiment can trigger use of the decision data structure as shown in Table B so that a certainly configured utility processing resource is selected in dependence on loading of processing resource 42.

TABLE B

| Row | Storage Memory Utilization | System Memory Utilization | Processing Unit Utilization | Selection of Utility Processing Resource |
|---|---|---|---|---|
| 1 | 1 | 1 | 1 | — |
| 2 | 1 | 1 | 2 | 42F |
| 3 | 1 | 1 | 3 | 42F(2) |
| 4 | 1 | 2 | 1 | 42F(3) |
| 5 | 1 | 2 | 2 | 42F(4) |
| 6 | 1 | 2 | 3 | 42F(5) |
| 7 | ... | ... | ... | ... |

Referring to Table B, the selected utility processing resource associated to Row 6 of Table A can be selected using artificial intelligence (AI) so that resource allocations of the selected utility processing resource are in dependence on particular attributes of a loading condition. Table B specifies loading conditions expressed in terms of first, second, and third parameter values. The parameter values can be, for example, storage memory utilization, system memory utilization, and/or processing unit utilization. The utilization classification 1 can indicate that utilization is below a first threshold, the utilization classification 2 can indicate that utilization is above the first threshold but below a second threshold, and the utilization classification 3 can indicate that utilization is above a second threshold wherein a second threshold is higher than the first threshold. Each parameter can have associated first and second thresholds.

As depicted in Table B different Rows can be fired in dependence on the particular loading conditions. Referring to Row 2 utility processing resource 42F can be selected when storage memory utilization and system memory utilization are below a first threshold for those parameters, but processing utilization is above a first threshold for processing utilization. Row 6 can be fired to select utility processing resource 42F (5) when storage memory utilization is below a first threshold, and system memory utilization is above a first threshold for system memory utilization and processing utilization is above a second threshold for processing utilization. Each of the utility processing resources 42F-42F(n) can have a storage memory allocation sized in accordance with, e.g. proportional to the storage memory utilization of its respective firing condition row, a system memory allocation sized in accordance with, e.g. proportional to the system memory utilization of its respective firing condition row, and a processing unit allocation sized in accordance with, e.g. proportional to the processing unit utilization of its respective firing condition row.

In accordance with the intelligent selection process herein, utility processing resource 42F(5) can have resource allocations that are increased relative to utility processing resource 42F based on the firing condition specifying attributes of increased loading. For example, in dependence on the detected loading conditions described, utility processing resource 42F(5) can have a system memory allocation increased relative to that for utility processing resource 42F and can include a processing unit allocation increased relative to that for utility processing resource 42F.

The different loading classifications specified in Table B can be based on resource allocations associated to processing resource 42. For example, the first and second thresholds for each of the three parameters can be based on percentage values of an original resource allocation for processing resource 42. The first threshold can be for example 70% of an original resource allocation and the second threshold can be, e.g. 80% of an original resource allocation. With use of intelligent selection of a utility processing resource that is commensurate with and in dependence on particular loading conditions, system 100 can address conditions of increased loading while maintaining availability of overall system resources for other uses.

With further reference to the decision data structure of Table A, the action decision associated with each of Rows 1-10 can specify functions associated with data traffic migration in addition to provisioning a specified utility processing resource and migrating traffic from one or more client to the designated utility processing resource. Such additional functions explained with reference to the flowcharts of FIGS. 3 and 4 can include, e.g. blocking traffic from clients 120A-120Z (block 1103), state checking (block 1104), emulating client communications (block 1106), generating rules (block 1107), configuring of firewall to appropriately route traffic (block 1108), unblocking traffic (block 1109).

Where a utility processing resource is provided by a virtual machine, e.g. a container based virtual machine, or a hypervisor based virtual machine a migrating function can include instantiating the virtual machine (block 1102) in response to a detected one or more criterion. With further reference to the decision data structure of Table A, embodiments herein recognize that the different one or more criterion of Table A can have differentiated time periods of interest. For example, "more than a threshold percentage of client requests received at processing resource 42 have resulted in port open periods of longer than a first threshold" can refer to "more than a threshold percentage of client requests received at processing resource 42 within a time window ending at the current time have resulted in port open periods of longer than a first threshold". Further "threshold" as set forth herein can refer e.g. to a fixed numerical threshold or a dynamically determined threshold determined based e.g. on a dynamically determined standard deviation from a mean of the distribution.

With further reference to Row 6, first clients migrated to a selected one of utility processing resources 42F-42F(n) can be clients selected according to various policies. According to one embodiment, the selected one of utility processing resources 42F-42F(n) can be configured to have an increased resource allocation (in terms of processing unit allocation, system memory allocation, and/or storage memory allocation) and the migrated first clients can be selected to be connected clients having the highest current reputation scores. According to another policy oldest clients can be migrated, and according to another policy newest clients can be migrated.

According to another policy, system 100 can examine timing data associated to current message pattern data to identify clients having messages with matching timing data (matching based on similarity scores being within a threshold). Embodiments herein recognize that messages from different clients having matching timing data can be indicative of the clients being in conversation with one another e.g. via messaging service of service application 143 or otherwise interacting with one another in a multiple client session. According to one policy, system 100 for providing the first clients referred to in Row 6 can group clients identified as having matching timing data together so that clients having matched timing data are grouped together and included in the first clients which are migrated to utility processing resource and/or included in the second clients which are not migrated and remain hosted by a processing resource. According to one policy, system 100 can perform first client selection in a manner so that a number instances where clients that have matching timing data (and therefore are determined to be interacting clients) are distributed between the first client (migrated) and second clients (not migrated) is reduced (e.g. made smaller or eliminated). According to the described policy, clients determined to be interacting clients can be preferentially grouped together so that determined interacting clients are grouped together as first clients which are migrated or are grouped together as second clients which are not migrated.

Enforcing the policy described based on examination of timing data, additional messaging system conversations (or alternative interactions) between interacting clients can be maintained notwithstanding service failure occurring in one of a processing resource and utility processing resource. Embodiments herein recognize that where service is lost in one processing resource of first and second processing resources, and first and second interacting clients are distributed between the first and second processing resources, loss of service in one of the processing resources can be expected to terminate interactions between the first and second clients. Where service is lost in one processing resource of first and second processing resources, and first and second interacting clients are grouped together in either the first processing resource or the second processing resources, loss of service in the first processing resource (utility or non-utility) will not terminate interactions between the first and second clients where the first and second clients are grouped together in the second processing resource. Enforcing the policy described based on examination of timing data, wherein clients having matching timing data can be grouped together in a migration, can avoid state synchronization costs in use cases where state synchronization between a processing resource and a utility processing resource may be used to maintain interactions between clients subsequent to an initial synchronization of state (block 1407).

Figure 8:
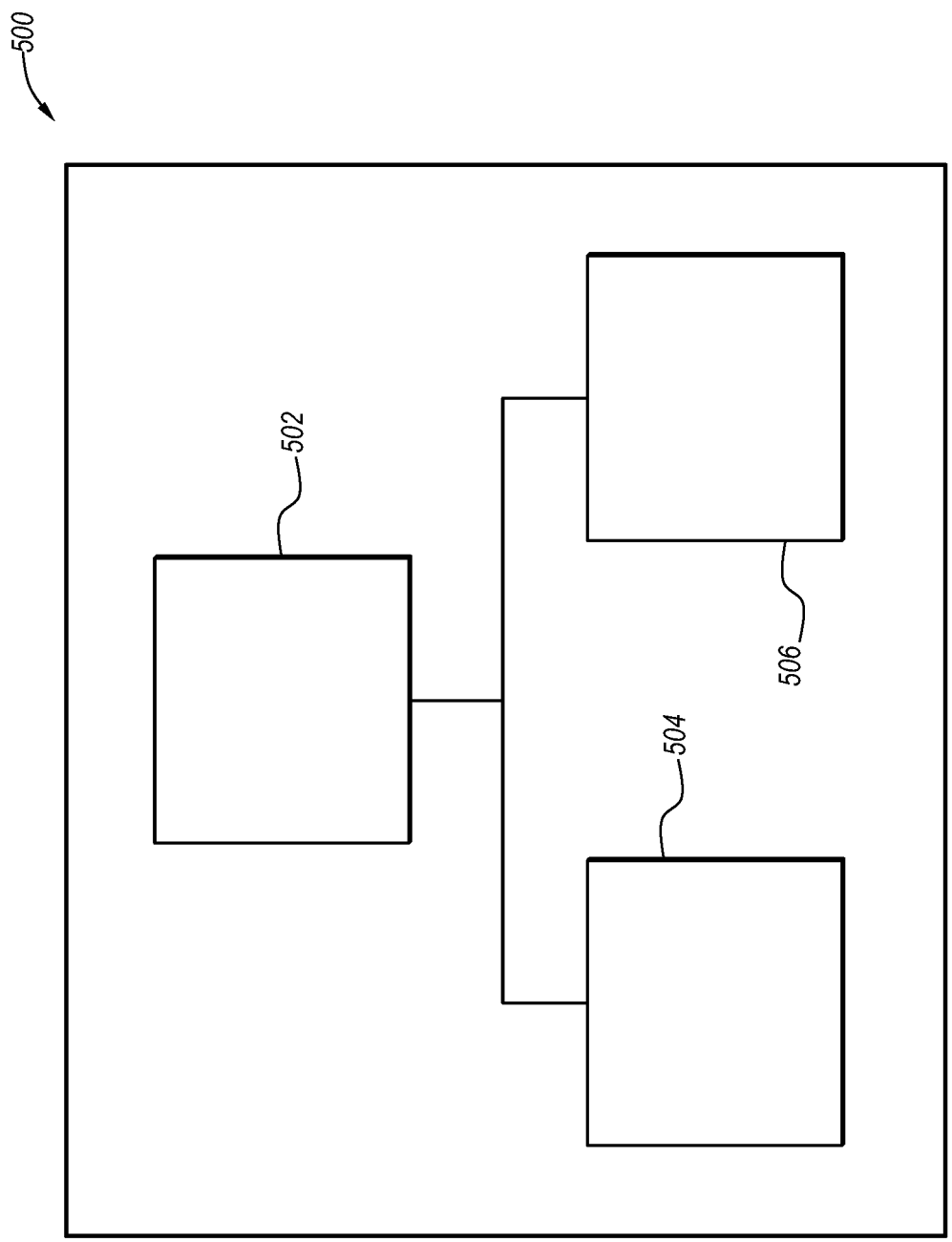
FIG. 8 is a schematic block diagram illustrating a computer system according to one embodiment.

Processes described herein may be performed by one or more computer systems or other processing devices, as provided, in a server as set forth herein. An example computer system to incorporate and use aspects described herein is depicted and described with reference to FIG. 8. Computer system 500 can include one or more processor 502, memory 504, and one or more I/O device 506, which may be coupled to each other by busses and other electrical hardware elements (not depicted). Processor(s) 502 include any appropriate hardware component(s) capable of implementing functions, for instance executing instruction(s) (sometimes alternatively referred to as code, firmware and/or software) retrieved from memory 504. Execution of the instructions causes the computer system 500 to perform processes, functions, or the like, such as those described with reference to the methods set forth herein. One or more computer system configured according to computer system 500 can host one or more virtual machine (VM) such as a hypervisor based virtual machine, and/or a container based virtual machine as set forth herein.

In some examples, aspects described herein are performed by a plurality of homogenous or heterogeneous computer systems coordinated to collectively perform processes, functions, or the like, such as those described herein.

Memory 504 can include hardware components or other storage devices to store data such as programs of instructions for execution, and other data. The storage devices may be magnetic, optical, and/or electrical-based, as examples. Hard drives, field-programmable gate arrays (FPGAs), magnetic media, compact disks (CDs), digital versatile disks (DVDs), and flash memories are example storage devices. Accordingly, memory 504 may be volatile, non-volatile, or a combination of the two. As a specific example, memory 504 includes one or more hard drives and one or more random-access memory (RAM) devices for, respectively, non-volatile and volatile storage of data. Example programs stored by memory include an operating system and applications that run on the operating system, such as specialized applications to perform functions described herein. Memory 504 can define a computer readable storage medium. A computer readable storage medium, as used herein, is not to be interpreted as being transitory signals per se. There is set forth herein a system, a method, and/or a computer program product. The computer program product can include a computer readable storage medium (or media) having computer readable program instructions thereon for causing a one or more processor to carry out methods and/or functions set forth herein.

I/O device(s) 506 can include hardware and/or software components that support input and output of data to/from computer system 500. I/O device(s) 506 include physical components that attach physically or wirelessly to the computer system. I/O device(s) 506 can also include, but are not limited to, I/O controllers and hardware and software supporting data communication with the aforementioned components, such as network, graphics, and/or audio controller(s). An example I/O device 506 is a network adapter for communication of data between computer system 500 and another component, such as another computer system, across communication links. Examples include Ethernet, cable, WiFi, cellular and/or fiber-based communications links passing data packets between computer system 500 and other systems across one or more networks, such as the Internet. Other example I/O devices 506 include universal serial bus (USB), peripheral component interconnect (PCI), and serial adapters/interfaces configured to couple to devices of their respective kind.

A small sample of methods, products and systems set forth herein include as follows.

A1. A method comprising: obtaining data traffic monitoring data, the data traffic monitoring data being in dependence on monitoring of traffic received by a processing resource of a computing environment; obtaining a state of the processing resource and provisioning a utility processing resource to include the state of the processing resource; and configuring the computing environment to route data traffic to the utility processing resource. A2. The method of A1, wherein the method includes performing the monitoring of traffic to detect that suspicious traffic has been received, wherein the configuring the computing environment to route data traffic to the utility processing resource includes configuring the computing environment to route data from a certain client to the utility processing resource, the certain client determined to be sending suspicious traffic. A3. The method of A1, wherein the method includes performing the monitoring of traffic to detect that suspicious traffic has been received, wherein the configuring the computing environment to route data traffic to the utility processing resource includes configuring the computing environment to route data from a certain client determined to be sending suspicious traffic to the utility processing resource, wherein the utility processing resource is configured to send one or more communication to the certain client to deceive the certain client into determining that an attack has been successful. A4. The method of A1, wherein the method includes performing the monitoring of traffic to detect that traffic has been received from a certain client determined to be exhibiting client message activity preferred by an enterprise, wherein the configuring the computing environment to route data traffic to the utility processing resource includes configuring the computing environment to route data from a certain client determined to be exhibiting client message activity preferred by an enterprise to the utility processing resource, wherein the utility processing resource is configured so that the certain client is provided with a prioritized level of service. A5. The method of A1, wherein the monitoring of traffic includes monitoring traffic received by the processing resource from a plurality of clients, wherein the method includes performing the monitoring of traffic to detect that one or more criterion has been satisfied, wherein the method includes (a) blocking traffic from the plurality of clients prior to the obtaining the state of the processing resource, and (b) unblocking the traffic from the plurality of clients subsequent to the provisioning the utility processing resource to include the state of the processing resource. A6. The method of A1, wherein the configuring the computing environment to route data traffic to the utility processing resource includes updating a firewall so that packets received from one or more client sending suspicious data traffic is routed to the utility processing resource. A7. The method of A1, wherein the monitoring of traffic includes running, within the processing resource, a monitoring process to perform a detecting that one or more criterion has been satisfied. A8. The method of A1, wherein the monitoring of traffic includes running, on a host that hosts the processing resource, a monitoring process to perform a detecting that one or more criterion has been satisfied. A9. The method of A1, wherein the method includes instantiating the utility processing resource in response to the data traffic monitoring data. A10. The method of A1, wherein the method includes instantiating the utility processing resource in response to the data traffic monitoring data, the data traffic monitoring data indicating that suspicious data traffic has been received by the processing resource. A11. The method of A1, wherein the method includes instantiating the utility processing resource in response to the data traffic monitoring data, the data traffic monitoring data indicating that traffic is being received from a prioritized client. A12. The method of A1, wherein the configuring the computing environment to route data traffic to the utility processing resource includes configuring the computing environment to route data traffic addressed to the processing resource to the utility processing resource. A13. The method of A1, wherein the monitoring of traffic includes identifying one or more suspicious client sending the suspicious data traffic. A14. The method of A1, wherein the method includes, in response traffic monitoring data indicating suspicious data traffic, blocking data traffic to the processing resource. A15. The method of A1, wherein the traffic monitoring data indicates one or more suspicious client sending suspicious data traffic, and wherein the method includes, in response to detecting suspicious data traffic, sending an emulated communication to the processing resource that emulates a communication from the one or more suspicious client, the emulated communication configured to terminate target flows in the processing resource. A16. The method of A1, wherein the method includes starting the utility processing resource and unblocking data traffic to the utility processing resource. A17. The method of A1, wherein the monitoring of traffic includes monitoring traffic received by the processing resource from a plurality of clients, wherein the method includes performing the monitoring of traffic to detect that one or more criterion has been satisfied, wherein the obtaining the state of the processing resource and provisioning a utility processing resource to include the state of the processing resource are performed in response to the one or more criterion being satisfied, wherein method includes further in response to the one or more criterion being satisfied (a) blocking, prior to the obtaining of the state, traffic from the plurality of clients (b) emulating communications from first clients of the plurality clients to the processing resource to close TCP connections between the processing resource and the first clients, (c) emulating communications from second clients of the plurality clients to the utility processing resource to close TCP connections between the processing resource and the second clients, (d) unblocking, subsequent to the provisioning, traffic to the processing resource, and (e) performing the configuring the computing environment to route data traffic to the utility processing resource, wherein the performing the configuring includes performing the configuring so that traffic from the plurality of clients for sending to the processing resource prior the one or more criterion being satisfied is separated so that subsequent to the one or more criterion being satisfied traffic from the first clients for sending to the processing resource is migrated for servicing by the utility processing resource and further so that traffic from the second clients for sending to the processing resource is not migrated and continues to be routed to the processing resource. A18. The method of A1, wherein the monitoring of traffic includes monitoring traffic received by the processing resource from a plurality of clients, wherein the method includes performing the monitoring of traffic to detect that one or more criterion has been satisfied, and the wherein the obtaining the state of the processing resource and provisioning a utility processing resource to include the state of the processing resource are performed in response to the one or more criterion being satisfied, wherein method includes further in response to the one or more criterion being satisfied (a) blocking traffic from the plurality of clients, (b) emulating communications from first clients of the plurality clients to the processing resource to close connections between the processing resource and the first clients, (c) emulating communications from second clients of the plurality clients to the utility processing resource to close connections between the processing resource and the second clients, (d) unblocking traffic to the processing resource, and (e) performing the configuring the computing environment to route data traffic to the utility processing resource, wherein the performing the configuring includes performing the configuring so that traffic from the plurality of clients for sending to the processing resource prior the one or more criterion being satisfied is separated so that subsequent to the one or more criterion being satisfied traffic from the first clients for sending to the processing resource is migrated for servicing by the utility processing resource and further so that traffic from the second clients for sending to the processing resource is not migrated and continues to be routed to the processing resource, wherein the processing resource is configured to run a first service application for providing a first service to the first clients, wherein the processing resource is a container based virtual machine, wherein the utility processing resource is a container based virtual machine, wherein the utility processing resource is configured to run the first service application for providing the first service to the second clients, wherein the one or more criterion includes one or more of the following selected from the group consisting of (i) loading has exceeded a threshold at the processing resource, (ii) suspicious traffic has been received at the processing resource, (iii) more than a threshold percentage of client requests received at the processing resource have resulted in port open periods of longer than a threshold, and (iv) traffic attributable to a certain type of client message activity preferred by an enterprise has been received at the processing resource. A19. The method of A1, wherein the monitoring of traffic includes monitoring traffic received by the processing resource from a plurality of clients, wherein the method includes performing the monitoring of traffic to detect that one or more criterion has been satisfied, wherein the obtaining the state of the processing resource and provisioning a utility processing resource to include the state of the processing resource are performed in response to the one or more criterion being satisfied, wherein the one or more criterion is that processing unit utilization of the processing resource has exceeded a threshold, wherein the method is performed so that a processing unit resource allocation of the utility processing resource is in dependence of the processing unit utilization of the processing resource. A20. The method of A1, wherein the monitoring of traffic includes monitoring traffic received by the processing resource from a plurality of clients, wherein the method includes performing the monitoring of traffic to detect that one or more criterion has been satisfied, wherein the obtaining the state of the processing resource and provisioning a utility processing resource to include the state of the processing resource are performed in response to the one or more criterion being satisfied, wherein the method includes determining for the processing resource processing unit utilization, system memory utilization, and storage memory utilization, wherein the method is performed so that a resource allocation for the utility processing resource is in dependence on the determining of each of the processing unit utilization, system memory utilization, and storage memory utilization. A21. The method of A1, wherein the monitoring of traffic includes monitoring traffic received by the processing resource from a plurality of clients, wherein the method includes performing by the processing resource the monitoring of traffic to detect that one or more criterion has been satisfied, wherein the obtaining the state of the processing resource and provisioning a utility processing resource to include the state of the processing resource are performed in response to the one or more criterion being satisfied, wherein the method includes running in the utility processing resource system call examining for threat detection, and wherein the monitoring of traffic by the processing resource is absent of system call examining for threat detection. A22. The method of A1, wherein the monitoring of traffic includes monitoring traffic received by the processing resource from a plurality of clients, wherein the method includes performing by the processing resource the monitoring of traffic to detect that one or more criterion has been satisfied, wherein the obtaining the state of the processing resource and provisioning a utility processing resource to include the state of the processing resource are performed in response to the one or more criterion being satisfied, wherein the one or more one or more criterion is that suspicious traffic has been received, wherein a processing unit allocation for the utility processing resource is less than a processing unit allocation for the processing resource so that the utility processing resource is more likely to send a service unavailable message to a malicious client than the processing resource. A23. The method of A1, wherein the monitoring of traffic includes monitoring traffic received by the processing resource from a plurality of clients, wherein the method includes performing by the processing resource the monitoring of traffic to detect that one or more criterion has been satisfied, wherein the obtaining the state of the processing resource and provisioning a utility processing resource to include the state of the processing resource are performed in response to the one or more criterion being satisfied, wherein the one or more one or more criterion is that a loading threshold of the processing resource has been exceeded, wherein the method includes examining timing data of connected clients connected to the processing resource for identifying clients having matching timing data indicative of interacting clients, wherein the method includes selecting clients for migration to the utility processing resource in a manner dependent on the identifying. A24. The method of A1, wherein the monitoring of traffic includes monitoring traffic received by the processing resource from a plurality of clients, wherein the method includes performing by the processing resource the monitoring of traffic to detect that one or more criterion has been satisfied, wherein the obtaining the state of the processing resource and provisioning a utility processing resource to include the state of the processing resource are performed in response to the one or more criterion being satisfied, wherein satisfaction of the one or more criterion is in dependence on an examination of reputation data of connected clients connected to the processing resource, wherein the utility processing resource has a processing unit allocation exceeding that of the processing unit, and wherein the method includes migrating certain clients of the connected clients having reputation scores exceeding a threshold so that the certain clients are provided with an improved level of service by the utility processing resource. A25. The method of A1, wherein the monitoring of traffic includes monitoring traffic received by the processing resource from a plurality of clients, wherein the method includes performing by the processing resource the monitoring of traffic to detect that one or more criterion has been satisfied, wherein the obtaining the state of the processing resource and provisioning a utility processing resource to include the state of the processing resource are performed in response to the one or more criterion being satisfied, wherein satisfaction of the one or more criterion is in dependence on an examination of reputation data of connected clients connected to the processing resource.

B1. A computer program product comprising: a computer readable storage medium readable by one or more processing circuit and storing instructions for execution by one or more processor for performing a method, the method comprising: obtaining data traffic monitoring data, the data traffic monitoring data being in dependence on monitoring of traffic received by a processing resource of a computing environment; instantiating a utility processing resource; obtaining a state of the processing resource and provisioning the utility processing resource to include the state of the processing resource; and configuring the computing environment to route data traffic to the utility processing resource.

C1. A system comprising: a memory; at least one processor in communication with memory; and program instructions executable by one or more processor via the memory to perform a method comprising: obtaining data traffic monitoring data, the data traffic monitoring data being in dependence on monitoring of traffic received by a processing resource of a computing environment; instantiating a utility processing resource; obtaining a state of the processing resource and provisioning the utility processing resource to include the state of the processing resource; and configuring the computing environment to route data traffic to the utility processing resource.

D1. A method comprising: obtaining data traffic monitoring data, the data traffic monitoring data being in dependence on monitoring of traffic received by a container of a protected computing environment; instantiating a utility container; obtaining a state of the container and provisioning the utility container to include the state of the container; and configuring the protected computing environment to route data traffic to the utility container. D2. The method of D1, wherein the configuring the protected computing environment to route data traffic to the utility container includes updating a firewall so that packets received from one or more client sending suspicious data traffic is routed to the utility container. D3. The method of D1, wherein the monitoring of traffic includes running, within the container, a monitoring process to perform the detecting. D4. The method of D1, wherein the monitoring of traffic includes running, on a host that hosts the container, a monitoring process to perform the detecting. D5. The method of D1, wherein the instantiating a utility container is performed in response to the data traffic monitoring data. D6. The method of D1, wherein the instantiating a utility container is performed in response to the data traffic monitoring data, the data traffic monitoring data indicating that suspicious data traffic has been received by the container. D7. The method of D1, wherein the instantiating a utility container is performed in response to the data traffic monitoring data, the data traffic monitoring data indicating that traffic is being received from a prioritized client. D8. The method of D1, wherein the configuring the protected computing environment to route data traffic to the utility container includes configuring the protected computing environment to route data traffic addressed to the container to the utility container. D9. The method of D1, wherein the monitoring of traffic includes identifying one or more suspicious client sending the suspicious data traffic. D10. The method of D1, wherein the method includes, in response traffic monitoring data indicating suspicious data traffic, blocking data traffic to the container. D11. The method of D1, wherein the traffic monitoring data indicates one or more suspicious client sending suspicious data traffic, and wherein the method includes, in response to detecting suspicious data traffic, sending an emulated communication to the container that emulates a communication from the one or more suspicious client, the emulated communication configured to terminate target flows in the container. D12. The method of D1, wherein the method includes starting the utility container and unblocking data traffic to the utility container.

E1. A computer program product comprising: a computer readable storage medium readable by one or more processing circuit and storing instructions for execution by the one or more processor for performing a method, the method comprising: obtaining data traffic monitoring data, the data traffic monitoring data being in dependence on monitoring of traffic received by a container of a protected computing environment; instantiating a utility container; obtaining a state of the container and provisioning the utility container to include the state of the container; and configuring the protected computing environment to route data traffic to the utility container.

F1. A system comprising: a memory; at least one processor in communication with memory; and program instructions executable by one or more processor via the memory to perform a method comprising: obtaining data traffic monitoring data, the data traffic monitoring data being in dependence on monitoring of traffic received by a container of a protected computing environment; instantiating a utility container; obtaining a state of the container and provisioning the utility container to include the state of the container; and configuring the protected computing environment to route data traffic to the utility container.

This written description uses examples to disclose the subject matter, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While the dimensions and types of materials described herein are intended to define the parameters of the various examples, they are by no means limiting and are merely exemplary. Many other examples will be apparent to those of skill in the art upon reviewing the above description. The scope of the various examples should, therefore, be determined with reference to the appended claims, along with the full scope of equivalents to which such claims are entitled. In the appended claims, the terms "including" and "in which" are used as the plain- English equivalents of the respective terms "comprising" and "wherein." Moreover, in the following claims, the terms "first," "second," and "third," etc. are used merely as labels, and are not intended to impose numerical requirements on their objects. Forms of term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the subject matter has been described in detail in connection with only a limited number of examples, it should be readily understood that the subject matter is not limited to such disclosed examples. Rather, the subject matter can be modified to incorporate any number of variations, alterations, substitutions or equivalent arrangements not heretofore described, but which are commensurate with the spirit and scope of the subject matter. Additionally, while various examples of the subject matter have been described, it is to be understood that aspects of the disclosure may include only some of the described examples. Also, while some examples are described as having a certain number of elements it will be understood that the subject matter can be practiced with less than or greater than the certain number of elements. Accordingly, the subject matter is not to be seen as limited by the foregoing description but is only limited by the scope of the appended claims.

The invention claimed is:

1. A method comprising:
    obtaining data traffic monitoring data, the data traffic monitoring data being in dependence on monitoring of traffic received by a processing resource of a computing environment;
    obtaining a state of the processing resource and provisioning a utility processing resource to include the state of the processing resource; and
    configuring the computing environment to route data traffic to the utility processing resource, wherein the monitoring of traffic includes monitoring traffic received by the processing resource from a plurality of clients, wherein the method includes performing by the processing resource the monitoring of traffic to detect that one or more criterion has been satisfied, wherein the obtaining the state of the processing resource and provisioning a utility processing resource to include the state of the processing resource are performed in response to the one or more criterion being satisfied, wherein satisfaction of the one or more criterion is in dependence on an examination of reputation data of connected clients connected to the processing resource, wherein the utility processing resource has a processing unit allocation exceeding that of the processing resource, and wherein the method includes migrating certain clients of the connected clients having reputation scores exceeding a threshold so that the certain clients are provided with an improved level of service by the utility processing resource.

2. The method of claim 1, wherein the method includes performing the monitoring of traffic to detect that suspicious traffic has been received, wherein the configuring the computing environment to route data traffic includes configuring the computing environment to route data from a certain client to a second utility processing resource, the certain client determined to be sending suspicious traffic.

3. The method of claim 1, wherein the method includes performing the monitoring of traffic to detect that suspicious traffic has been received, wherein the configuring the computing environment to route data traffic includes configuring the computing environment to route data from a certain client determined to be sending suspicious traffic to a second utility processing resource, wherein the second, utility processing resource is configured to send one or more communication to the certain client to deceive the certain client into determining that an attack has been successful.

4. The method of claim 1, wherein the method includes performing the monitoring of traffic to detect that traffic has been received from a certain client determined to be exhibiting client message activity preferred by an enterprise, wherein the configuring the computing environment to route data traffic to the utility processing resource includes configuring the computing environment to route data from a certain client determined to be exhibiting client message activity preferred by an enterprise to the utility processing resource, wherein the utility processing resource is configured so that the certain client is provided with a prioritized level of service.

5. The method of claim 1, wherein the method includes (a) blocking traffic from the plurality of clients prior to the obtaining the state of the processing resource, and (b) unblocking the traffic from the plurality of clients subsequent to the provisioning the utility processing resource to include the state of the processing resource.

6. The method of claim 1, wherein the configuring the computing environment to route data traffic includes updating a firewall so that packets received from one or more client sending suspicious data traffic is routed to a second utility processing resource.

7. The method of claim 1, wherein the method includes instantiating the utility processing resource in response to the data traffic monitoring data.

8. The method of claim 1, wherein the traffic monitoring data indicates one or more suspicious client sending suspicious data traffic, and wherein the method includes, in response to detecting suspicious data traffic, sending an emulated communication to the processing resource that emulates a communication from the one or more suspicious client, the emulated communication configured to terminate target flows in the processing resource.

9. The method of claim 1, wherein method includes further in response to the one or more criterion being satisfied (a) blocking, prior to the obtaining of the state, traffic from the plurality of clients (b) emulating communications from first clients of the plurality clients to the processing resource to close TCP connections between the processing resource and the first clients, (c) emulating communications from second clients of the plurality clients to the utility processing resource to close TCP connections between the processing resource and the second clients, (d) unblocking, subsequent to the provisioning, traffic to the processing resource, and (e) performing the configuring the computing environment to route data traffic to the utility processing resource, wherein the performing the configuring includes performing the configuring so that traffic from the plurality of clients for sending to the processing resource prior to the one or more criterion being satisfied is separated so that subsequent to the one or more criterion being satisfied traffic from the first clients for sending to the processing resource is migrated for servicing by the utility processing resource and further so that traffic from the second clients for sending to the processing resource is not migrated and continues to be routed to the processing resource.

10. The method of claim 1, wherein the one or more criterion is that processing unit utilization of the processing resource has exceeded a threshold, wherein the method is performed so that a processing unit resource allocation of the utility processing resource is in dependence of the processing unit utilization of the processing resource.

11. The method of claim 1, wherein the method includes determining for the processing resource processing unit utilization, system memory utilization, and storage memory utilization, wherein the method is performed so that a resource allocation for the utility processing resource is in dependence on the determining of each of the processing unit utilization, system memory utilization, and storage memory utilization.

12. The method of claim 1, wherein the method includes running in a second utility processing resource system call examining for threat detection, and wherein the monitoring of traffic by the processing resource is absent of system call examining for threat detection.

13. The method of claim 1, wherein the one or more one or more criterion is that suspicious traffic has been received, wherein a processing unit allocation for a second utility processing resource is less than a processing unit allocation for the processing resource so that the second utility processing resource is more likely to send a service unavailable message to a malicious client than the processing resource.

14. The method of claim 1, wherein the one or more one or more criterion is that a loading threshold of e processing resource has been exceeded, wherein the method includes examining timing data of connected clients connected to the processing resource for identifying clients having matching timing data indicative of interacting clients, wherein the method includes selecting clients for migration to the utility processing resource in a manner dependent on the identifying.

15. The method of claim 1,
wherein the obtaining a state of the processing resource and provisioning a utility processing resource to include the state of the processing resource includes obtaining a process state of a container based virtual machine processing resource and provisioning a container based virtual machine utility processing resource to include the process state of the processing resource so that the container based virtual machine utility processing resource and the container based virtual machine processing resource have a common process state.

16. The method of claim 15, wherein the obtaining includes obtaining the process state, as well as a file state, an open socket state, and a connection state of a container based virtual machine, and wherein the provisioning includes provisioning a container based virtual machine utility processing resource so that the container based virtual machine utility processing resource and the container based virtual machine processing resource have a common process state, a common file state, a common open socket state, and a common connection state.

17. The method of claim 1, wherein the processing resource and the utility processing resource are virtual machine processing resources.

18. The method of claim 1, wherein the processing resource and the utility processing resource are container based virtual machine processing resources.

19. A computer program product comprising:
a computer readable storage medium readable by one or more processing circuit and storing instructions for execution by one or more processor for performing a method, the method comprising:
obtaining data traffic monitoring data, the data traffic monitoring data being in dependence on monitoring of traffic received by a processing resource of a computing environment;
obtaining a state of the processing resource and provisioning a utility processing resource to include the state of the processing resource; and
configuring the computing environment to route data traffic to the utility processing resource, wherein the monitoring of traffic includes monitoring traffic received by the processing resource from a plurality of clients, wherein the method includes performing by the processing resource the monitoring of traffic to detect that one or more criterion has been satisfied, wherein the obtaining the state of the processing resource and provisioning a utility processing resource to include the state of the processing resource are performed in response to the one or more criterion being satisfied, wherein satisfaction of the one or more criterion is in dependence on an examination of reputation data of connected clients connected to the processing resource, wherein the utility processing resource has a processing unit allocation exceeding that of the processing resource, and wherein the method includes migrating certain clients of the connected clients having reputation scores exceeding a threshold so that the certain clients are provided with an improved level of service by the utility processing resource.

20. A system comprising:
a memory;
at least one processor in communication with the memory; and
program instructions executable by one or more processor via the memory to perform a method comprising:
obtaining data traffic monitoring data, the data traffic monitoring data being in dependence on monitoring of traffic received by a processing resource of a computing environment;
obtaining a state of the processing resource and provisioning a utility processing resource to include the state of the processing resource; and
configuring the computing environment to route data traffic to the utility processing resource, wherein the monitoring of traffic includes monitoring traffic received by the processing resource from a plurality of clients, wherein the method includes performing by the processing resource the monitoring of traffic to detect that one or more criterion has been satisfied, wherein the obtaining the state of the processing resource and provisioning a utility processing resource to include the state of the processing resource are performed in response to the one or more criterion being satisfied, wherein satisfaction of the one or more criterion is in dependence on an examination of reputation data of connected clients connected to the processing resource; wherein the utility processing resource has a processing unit allocation exceeding that of the processing resource, and wherein the method includes migrating certain clients of the connected clients having reputation scores exceeding a threshold so that the certain clients are provided with an improved level of service by the utility processing resource.

\* \* \* \* \*